(12) United States Patent
Oshima et al.

(10) Patent No.: US 11,010,119 B2
(45) Date of Patent: May 18, 2021

(54) PRINTING APPARATUS, PRINTING SYSTEM, AND PRINTING PROCESSING METHOD

(71) Applicant: SEIKO EPSON CORPORATION, Tokyo (JP)

(72) Inventors: Yasuhiro Oshima, Matsumoto (JP); Yasuhiro Furuta, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/689,363

(22) Filed: Nov. 20, 2019

(65) Prior Publication Data

US 2020/0167112 A1 May 28, 2020

(30) Foreign Application Priority Data

Nov. 22, 2018 (JP) .............................. JP2018-219084

(51) Int. Cl.
*G06F 3/12* (2006.01)

(52) U.S. Cl.
CPC .......... *G06F 3/1296* (2013.01); *G06F 3/1293* (2013.01)

(58) Field of Classification Search
CPC .................................................. G06F 3/1296
USPC ........................................................ 358/1.15
See application file for complete search history.

(56) References Cited

U.S. PATENT DOCUMENTS

| | | | |
|---|---|---|---|
| 8,159,723 B2 | 4/2012 | Yamada | |
| 8,218,180 B2 | 7/2012 | Shobu | |
| 8,670,161 B2 | 3/2014 | Salgado et al. | |
| 9,386,173 B2 | 7/2016 | Yamamoto | |
| 2002/0114004 A1* | 8/2002 | Ferlitsch | G06F 3/1259 |
| | | | 358/1.15 |
| 2015/0103376 A1* | 4/2015 | Saeda | H04N 1/00973 |
| | | | 358/1.15 |
| 2015/0156351 A1* | 6/2015 | Yamamoto | H04N 1/00973 |
| | | | 358/1.15 |
| 2017/0123741 A1* | 5/2017 | Duran, Jr. | G06F 3/1204 |
| 2020/0167105 A1* | 5/2020 | Oshima | G06F 3/1231 |

FOREIGN PATENT DOCUMENTS

JP    2017-011515    1/2017

* cited by examiner

*Primary Examiner* — Jacky X Zheng
(74) *Attorney, Agent, or Firm* — Workman Nydegger

(57) ABSTRACT

When a printing job that is not accumulated in a storage section of a printing apparatus is determined as an execution-target job, the printing apparatus acquires the execution-target job from one that is selected, of a different printing apparatus that accumulates the execution-target job and a terminal apparatus that transmits the execution-target job to the different printing apparatus.

15 Claims, 14 Drawing Sheets

PRINTING APPARATUS, PRINTING SYSTEM, AND PRINTING PROCESSING METHOD

The present application is based on, and claims priority from JP Application Serial Number 2018-219084, filed Nov. 22, 2018, the disclosure of which is hereby incorporated by reference herein in its entirety.

BACKGROUND

1. Technical Field

The present disclosure relates to a printing apparatus, a printing system, a printing processing method, and the like.

2. Related Art

Techniques in the related art, in which a printing job is shared among multiple printing apparatuses that possibly perform communication through a network, are known. In this case, it is possible that a printing apparatus which is different from a printing apparatus to which the printing job is transmitted performs processing that performs printing on the printing job. Regardless of which printing apparatus the printing job is transmitted to, it is possible that a user performs the printing processing in an arbitrary printing apparatus and acquires a result of the printing, and thus the convenience increases. For example, JP-A-2017-011515 discloses a technique that transmits and receives printing data to and from multiple printing apparatuses without using a server.

When the printing job is shared without using a server system as in JP-A-2017-011515, a transmission source of the printing job is any one of the printing apparatuses. In many cases, the printing apparatus has a lower processing capability than a server system or a general personal computer (PC). For that reason, there is a concern that it will take time to transmits the printing job from a given printing apparatus to a different printing apparatus and that a printing apparatus on the printing performing side will not bring out its original printing performance. For example, when a printing apparatus on the printing job transmitting side is under a heavy load, transmission of the printing job is delayed.

SUMMARY

According to an aspect of the present disclosure, there is provided a printing apparatus that shares a printing job with a different printing apparatus, the printing apparatus including: a processor that manages the printing job; a storage section in which the printing job is accumulated; and a printing section that performs printing based on the printing job, in which, when the printing job that is not accumulated in the storage section and is accumulated in the different printing apparatus is determined as the execution-target job, the processor selects one terminal from among multiple terminals that include the different printing apparatus that accumulates an execution-target job and a terminal apparatus which transmits the execution-target job to the different printing apparatus, and acquires the execution-target job from the selected terminal.

DESCRIPTION OF EXEMPLARY EMBODIMENTS

Suitable embodiments of the present disclosure will be described in detail below. It is noted that the embodiments that will be described below do not impose any improper limitation on the subjects of the inventions claimed in claims and that all configurations described in the present embodiments are not necessarily indispensable as solutions according to the present disclosure.

1. Systematic Configuration

Figure 1:
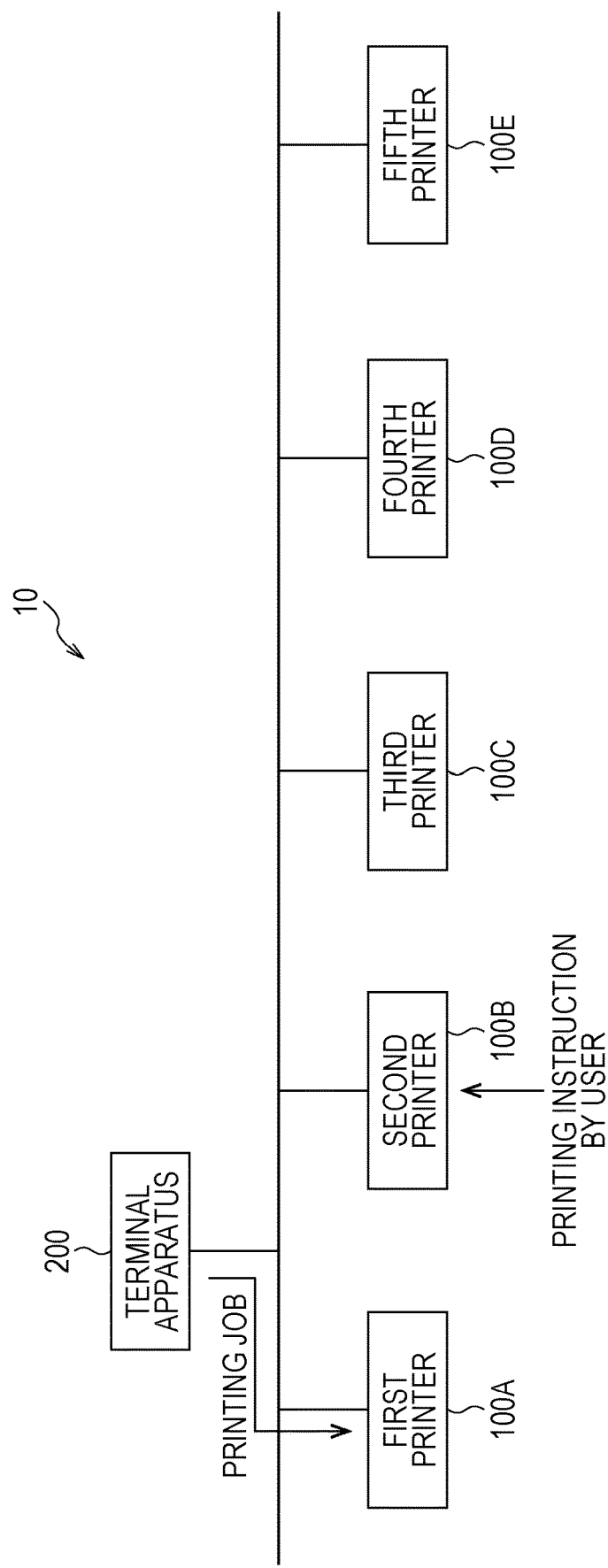
FIG. 1 is a diagram illustrating a configurational example of a printing system including a printing apparatus.

Configurational examples of a printing apparatus 100 and a printing system 10 including the printing apparatus 100 are described with reference to FIGS. 1 and 2. FIG. 1 is a configurational example of the printing system 10 in which a printing job is shared among multiple printing apparatuses 100. In FIG. 1, five printers, the first printer 100A to the fifth printer 100E are illustrated as printing apparatuses 100, but the number of the printing apparatuses 100 is not limited to 5.

The first printer 100A to the fifth printer 100E are communicative with each other through a network. The network here may be an internal network such as an intranet and may be a network that uses a public communication line such as the Internet.

A terminal apparatus 200 is an apparatus that transmits the printing job to a given printing apparatus 100 through the network. The terminal apparatus 200, for example, is a PC, but may be a portable terminal apparatus such as a smartphone or a tablet terminal. The number of the terminal apparatuses 200 is not limited to 1, and multiple terminal apparatuses 200 may be connected to the network.

Figure 2:
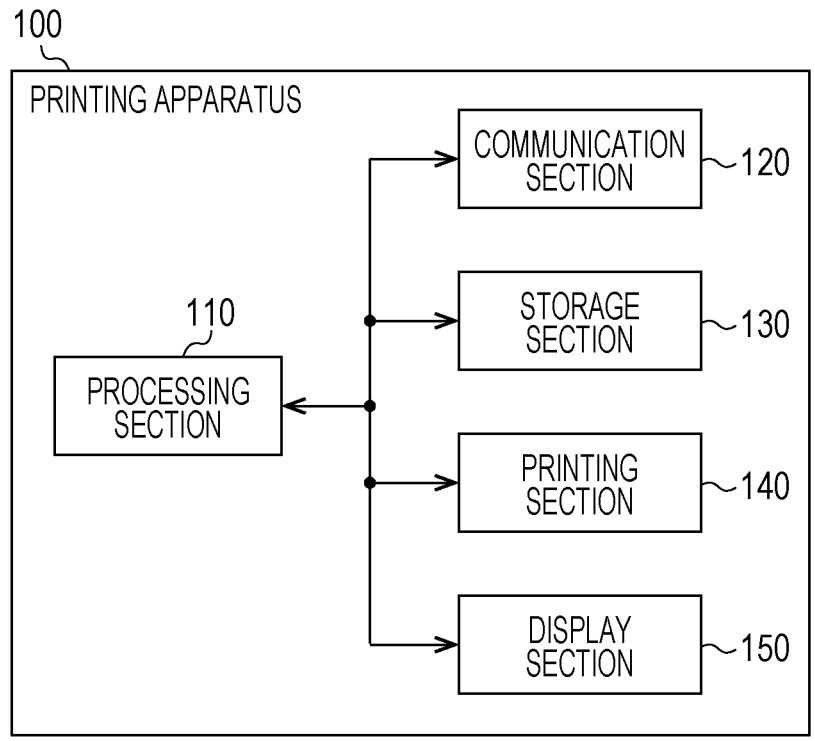
FIG. 2 is a diagram illustrating a configurational example of the printing apparatus.

FIG. 2 illustrates the configurational example of the printing apparatus 100. The printing apparatus 100 includes a processing section 110, a communication section 120, a storage section 130, a printing section 140, and a display section 150. However, the printing apparatus 100 is not limited to a configuration in FIG. 2, and various modification implementations are possible, such as omission of one or several of the constituent elements and addition of a different constituent element. Furthermore, the printing apparatus 100 may be a multifunction peripheral (MFP) that has multiple functions including a printing function.

The processing section 110 performs control of each section of the printing apparatus 100. For example, the processing section 110 can include multiple central processing units (CPUs), such as a main CPU and a sub-CPU, or can include a micro-processing unit (MPU). The main CPU performs control of each section of, or general control, of the printing apparatus 100. The sub-CPU, for example, performs various processing operations for printing. Alternatively, a CPU for communication processing may further be provided.

The processing section 110 is configured with the following hardware components. The hardware components can include at least one of a circuit that processes a digital signal and a circuit that processes an analog signal. For example, the hardware component is configured with one or multiple circuit devices that are mounted on a circuit substrate, or with one or multiple circuit elements. One or multiple circuits, for example, are ICs or the like. One or multiple circuit elements, for example, are resistors, capacitors or the like.

Furthermore, the processing section 110 may be realized by a processor that will be described below. The printing apparatus 100 according to the present embodiment includes a memory in which information is stored, and a processor that operates based on the information stored in the memory. Examples of the information include a program, various pieces of data, and the like. The processor includes hardware. It is possible that, regarding the processing, various processors, such as a CPU, a graphics processing unit (GPU), and a digital signal processor (DSP). The memory may be a semiconductor memory, such as a static random access memory (SRAM) or a dynamic random access memory (DRAM), be a register, be a magnetic storage device, such as a hard disk drive (HDD), and be an optical storage device, such as an optical disk device. For example, a computer-readable command is stored in the memory, and the command is executed by the processor. Thus, a function of each section of the printing apparatus 100 is realized as processing. The command here may be a command in a command set that makes up the program and may be a command that instructs a hardware circuit of the processor to perform an operation.

The communication section 120 performs communication with a different printing apparatus 100 and the terminal apparatus 200 through the network. The network here can be realized by a wide area network (WAN), a local area network (LAN), or the like, regardless of whether the network is wired or wireless. Specifically, the communication section 120 is a chip or a module that performs wired communication or wireless communication.

Various pieces of information, such as data and a program, are stored in the storage section 130. The processing section 110 or the communication section 120, for example, operates with the storage section 130 as a working area. The storage section 130 may be a semiconductor memory, be a register, be a magnetic memory device, and be an optical storage device.

The printing section 140 includes a printing engine. The printing engine has a mechanical configuration in which image printing is performed on a printing medium. The printing engine, for example, includes a transportation mechanism, an ink jet type discharge head, and a driving mechanism for a carriage including the discharge head, and the like. The printing engine discharges ink from the discharge head onto the printing medium that is transported by the transportation mechanism, and thus prints an image on the printing medium. As the printing media, various media can be used, such as a paper sheet and a piece of cloth. It is noted that a specific configuration of the printing engine is not limited to that described here as an example and may be one in which printing that uses toner is performed using an electrophotographic method.

The display section 150 is configured with a display on which various pieces of information are displayed, and the like. The display section 150, for example, is a touch panel and may also serve as an operation interface through which a user performs an input operation.

The terminal apparatus 200, for example, transmits the printing job to a first printer 100A. The user who transmits the printing job using the terminal apparatus 200 moves up to a desired printing apparatus 100 and acquires a result of the printing in the printing apparatus 100. Because the printing job is shared, the printing apparatus 100 from which the user acquires the result of the printing is not limited to the first printer 100A. It is possible that the user acquires the result of the printing from an arbitrary printing apparatus 100 that is among the first printer 100A to the fifth printer 100E.

A case is considered where, as illustrated in FIG. 1, the user instructs the second printer 100B to perform printing. The printing instruction here, for example, a log-in operation or an authentication operation that will be described below. In a technique in the related art, which is disclosed in JP-A-2017-011515, the second printer 100B acquires a printing job from the first printer 100A and then performs processing that prints the printing job. However, there are problems in terms of a concern that printing performance of the second printer 100B will not be sufficiently brought into play due to a processing capability of the first printer 100A and a concern that the second printer 100B will not suitably perform printing due to types of the first printer 100A and the second printer 100B. Each of the two concerns described above will be described below.

First, the problem due to the processing capability of the printing apparatus 100 on the printing job transmission side is described. In many cases, the printing apparatus 100 has a lower processing capability than a server system or a PC. When the printing apparatus 100 is under a heavy load, its ability to transfer the printing job reduces as well. For example, in an example in FIG. 1, when a situation is reached where the first printer 100A supplies the printing job to a printer other than the second printer 100B, a speed of transfer of the printing job from the first printer 100A to the second printer 100B decreases. In such a case, the speed of transfer of the printing job is lower than a printing speed of the second printer 100B, and there is a likelihood that the printing performance of the second printer 100B will not be brought into play to a maximum. For example, the printing speed is expressed with a size of data printable per unit time, and the speed of transfer is expressed with a size of data transferable per unit time. When printing speed>speed of transfer, because an actual printing speed is limited by the speed of transfer, the original printing ability of the second printer 100B is not brought into play.

A printing apparatus 100 according to a first embodiment, as illustrated in FIG. 1, is a printing apparatus that shares a printing job with a different printing apparatus 100. Furthermore, as illustrated in FIG. 2, the printing apparatus 100 includes a communication section 120 that performs communication with a different printing apparatus 100, a processing section 110 that performs control of the communication section 120, a storage section 130 in which the printing job is accumulated, and a printing section 140 that performs printing based on the printing job.

A case is considered where the printing job that is not accumulated in the storage section 130 of the printing apparatus 100, but accumulated in a different printing apparatus 100 is determined as an execution-target job. In an example in FIG. 1, the printing apparatus 100 is the second printer 100B that performs the printing processing, and a different printing apparatus 100 is the first printer 100A. In this case, the processing section 110 acquires the execution-target job from any one of a different printing apparatus 100 that accumulates the execution-target job, and the terminal apparatus 200 that transmits the execution-target job to the different printing apparatus 100. For example, the second printer 100B acquires the execution-target job from any one of the first printer 100A and the terminal apparatus 200.

In many cases, the terminal apparatus 200 has a higher processing capability than the printing apparatus 100. The acquisition of the printing job from the terminal apparatus 200 is made possible, and thus it is possible that a decrease in the speed of transfer of the printing job is suppressed and that the printing performance of the printing apparatus 100 is suitably brought into play.

However, in some cases, the terminal apparatus 200 is a hand-portable apparatus, such as a laptop PC or a portable terminal apparatus. For that reason, there is a concern that the printing job will be transmitted due to power-off or interruption of communication with the network. For example, a case is considered where the user performs an operation of transmitting the printing job for printing meeting materials from the terminal apparatus 200 to a given printing apparatus 100, and where is then the terminal apparatus 200 is released from the connection to the network. More precisely, an acquisition destination of the printing job is limited to the terminal apparatus 200, and thus there occurs a concern that the printing apparatus 100 will not suitably acquire the printing job. In this respect, the printing apparatus 100 according to the first embodiment sets both of a different printing apparatus 100 that accumulates a printing job and the terminal apparatus 200 that is a transmission source of the printing job, to be candidates for the acquisition destination of the printing job. If this is done, it is possible that the printing apparatus 100 acquires the printing job from a suitable apparatus, depending on the situation. For example, when the terminal apparatus 200 is powered off, it is possible that the printing job is acquired from the first printer 100A. With a technique according to the first embodiment, it is possible that the printing apparatus 100 is realized that results from considering both of the speed and the availability. It is noted that it is thought that a flow for acquiring the printing job from the terminal apparatus 200 and performing the printing is the same as that for general printing processing. However, processing in the first embodiment is pull-type processing in which the printing apparatus 100, when performing printing processing, actively acquires information necessary for the printing processing from the terminal apparatus 200. In this respect, the processing in the first embodiment is different from the technique in the related art.

The printing job here refers to a set of pieces of data that are used when the printing apparatus 100 performs one-time printing processing. The printing job includes at least both identification information for uniquely identifying the printing job and printing image data that is a target to be printed. It is noted that, as will described below with reference to FIG. 4, a printer driver 202 of the terminal apparatus 200 may perform processing that converts original data into printing data in a separate format, which is described using a page description language (PDL) or the like. The terminal apparatus 200 accumulates pre-conversion original data. The printing apparatus 100 receives and interprets post-conversion printing data and then accumulates a result of the interpretation processing. That is, in some cases, the same printing jobs may be different in data format from each other, depending on the situation. The printing job in the first embodiment, a second embodiment, and modification example of these is assumed to include pieces of information in various formats, such as the original data, the printing data, and the result of processing that interprets the printing data.

Furthermore, a technique that uses a server system is considered as an example for comparison with a technique that is illustrated in FIG. 1. In the comparison example, the printing job from the terminal apparatus 200 is collected in the server system. The server system transmits the printing job that corresponds to a user, to the printing apparatus 100 from which the user is a printing operation. In this comparative example, because the server system that has a higher processing capability than the printing apparatus 100 is the acquisition destination of the printing job, it is difficult for a decrease in the speed of transfer to occur. However, the comparative example incurs costs for introduction and operation of the server system. Furthermore, when the server system malfunctions, printing cannot be performed in all the printing apparatuses 100. From this perspective, a system that does not include the server system is considered as the printing system 10 that includes the printing apparatus 100 according to the first embodiment.

Next, a problem that occurs due to types of the printing apparatus 100 on the printing job transmission side and the printing apparatus 100 on the printing performing side is described. In FIG. 1, if all the first to fifth printers 100A to 100E are of the same type of apparatus, a hardware configuration of the printing apparatus 100, a property of ink or toner to be used, an available printing setting, and the like are common. That is, because it is possible that printing jobs that are accumulated in a given printing apparatus 100 is also used in a different printing apparatus 100, the printing job is easy to share.

However, when different types of printing apparatus are present, in some cases, the use of the printing jobs accumulated in the given printing apparatus 100 for the printing processing in a different printing apparatus 100 does not bring about a desired result. That is, there is a concern that the unconditional approval of the sharing of the printing job will not bring about a desired result of the printing. On the other hand, when the sharing of the printing job among different types of printing apparatuses 100 is prohibited in the same manner, unsuitable printing processing can be suppressed from being performed. However, because the probability decreases that the printing job will be shared, the convenience is reduced.

In the same manner as in the first embodiment, a printing apparatus 100 according to the second embodiment is a printing apparatus that shares a printing job with a different printing apparatus 100. As illustrated in FIG. 2, the printing apparatus 100 includes a communication section 120 that performs communication with a different printing apparatus 100, a processing section 110 that performs control of the communication section 120, a storage section 130 in which the printing job is accumulated, and a printing section 140 that performs printing based on the printing job.

The processing section 110 determines whether or not the printing apparatus 100 on the printing performing side, which includes the processing section 110, and a different printing apparatus 100 are of the same type of apparatus. When it is determined that the two printing apparatuses 100 are not of the same type of apparatus, based on at least one determination of the following first, second, and third determinations, the processing section 110 determines whether or not the printing section 140 of a different printing apparatus 100 possibly performs printing on the printing job that is accumulated by the different printing apparatus 100. The first determination is a determination of whether or not the printing job accumulated by a different printing apparatus 100 includes a printing setting that is dependent on a type of apparatus. The second determination is a determination relating to processing that rotates a printing image in the printing job accumulated by a different printing apparatus 100. The third determination is a determination relating to a data format of the printing image in the printing job accumulated by a different printing apparatus 100.

If this is done, based on a suitable determination condition that is among the first determination to the third determination, it is possible that the printing job is shared among different types of printing apparatuses. That is, while unsuitable printing processing is suppressed from being performed, the printing job is set to be shared when possible, and thus the convenience is improved.

Furthermore, as described above, a technique that uses a server system is considered as an example for comparison with the technique that is illustrated in FIG. 1. In this comparative example, because conversion or the like in compliance with a data format matched to the printing apparatus 100 on the printing performing side is possible in the server system that is the transmission source of the printing job, cooperation is comparatively easy among different types of printing apparatuses. However, as described above, from the perspective of the costs for introduction and operation of the server system and the risk of malfunction, a system that does not include the server system is considered as the printing system 10 that includes the printing apparatus 100 according to the second embodiment.

Each of the first embodiment and second embodiment will be described below. Thereafter, several modification implementations that include combinations of the first embodiment and the second embodiment will be described above.

2. First Embodiment

The first embodiment is described. Specifically, all processing operation are described, and then each processing operation is described in detail.

2.1 Flow for Processing

Figure 3:
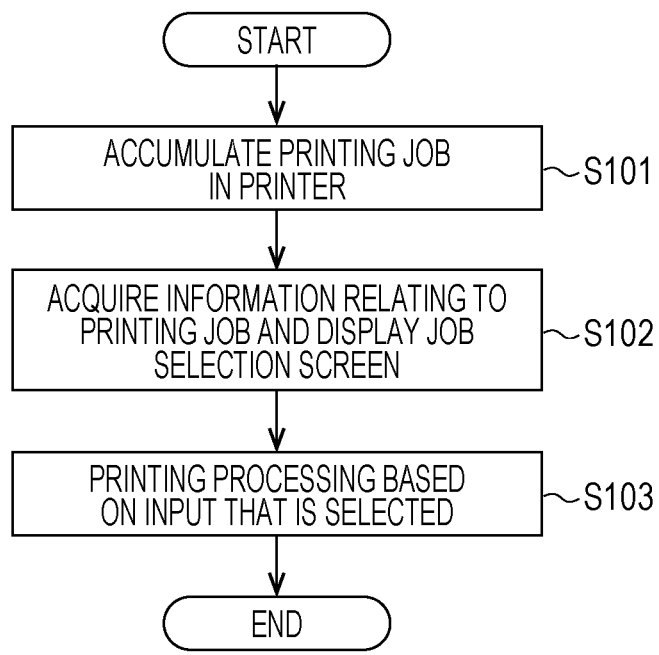
FIG. 3 is a flowchart for describing processing in the printing system.

FIG. 3 is a flowchart for describing processing in the printing system 10 including the printing apparatus 100 according to the first embodiment. When this processing is started, the printing operation is first performed in the terminal apparatus 200, and the printing job is accumulated in the storage section 130 of a given printing apparatus 100 (S101). An example will be described where the printing apparatus 100 that accumulates the printing job is the first printer 100A.

Next, the user instructs the printing apparatus 100, which is desired to perform printing, to perform the printing. An example is described where the printing apparatus 100 that is an entity which performs the printing processing is the second printer 100B. Specifically, the user performs authentication operation in the second printer 100B. The authentication operation may be an operation of shading a card reader with a given authentication card and may be an operation of inputting pieces of authentication information, such as a user ID, a password, and the like, into a touch panel of the second printer 100B. It is possible that the authentication operation is replaced with the log-in operation. The second printer 100B performs the authentication processing, and, when it is determined that the user is a registered user, proceeds to a specific processing relating to the printing. Authentication printing is widely known and thus a detailed description thereof is omitted. It is noted that, when carrying-away, mistaking, or the like of an original document, the authentication printing is desirably performed, but that the authentication printing is nor a requirement for configuration in the present embodiment, and thus omission thereof is possible.

The second printer 100B acquires information relating to the printing job from a different printing apparatus 100 that possibly performs communication through the storage section 130 of its own and a network, and displays a job selection screen for selecting the printing job on the display section 150 (S102). It is noted that at this point, because the displaying of the job selection screen is desirable, it is possible that the information acquired by the second printer 100B is defined as one piece of information in the printing job. For example, as will be described below with reference to FIG. 6, in processing S102, there is no need to acquire the printing image data that is a requirement for printing.

The second printer 100B receives an input, that is, the execution-target job that is selected by the user, and thus determines the execution-target job and performs the processing that prints the execution-target job (S103). In the first embodiment, the second printer 100B acquires the execution-target job, from any one of the first printer 100A and the terminal apparatus 200, and performs printing on the acquired execution-target job.

2.2 Accumulation of Printing Job

Figure 4:
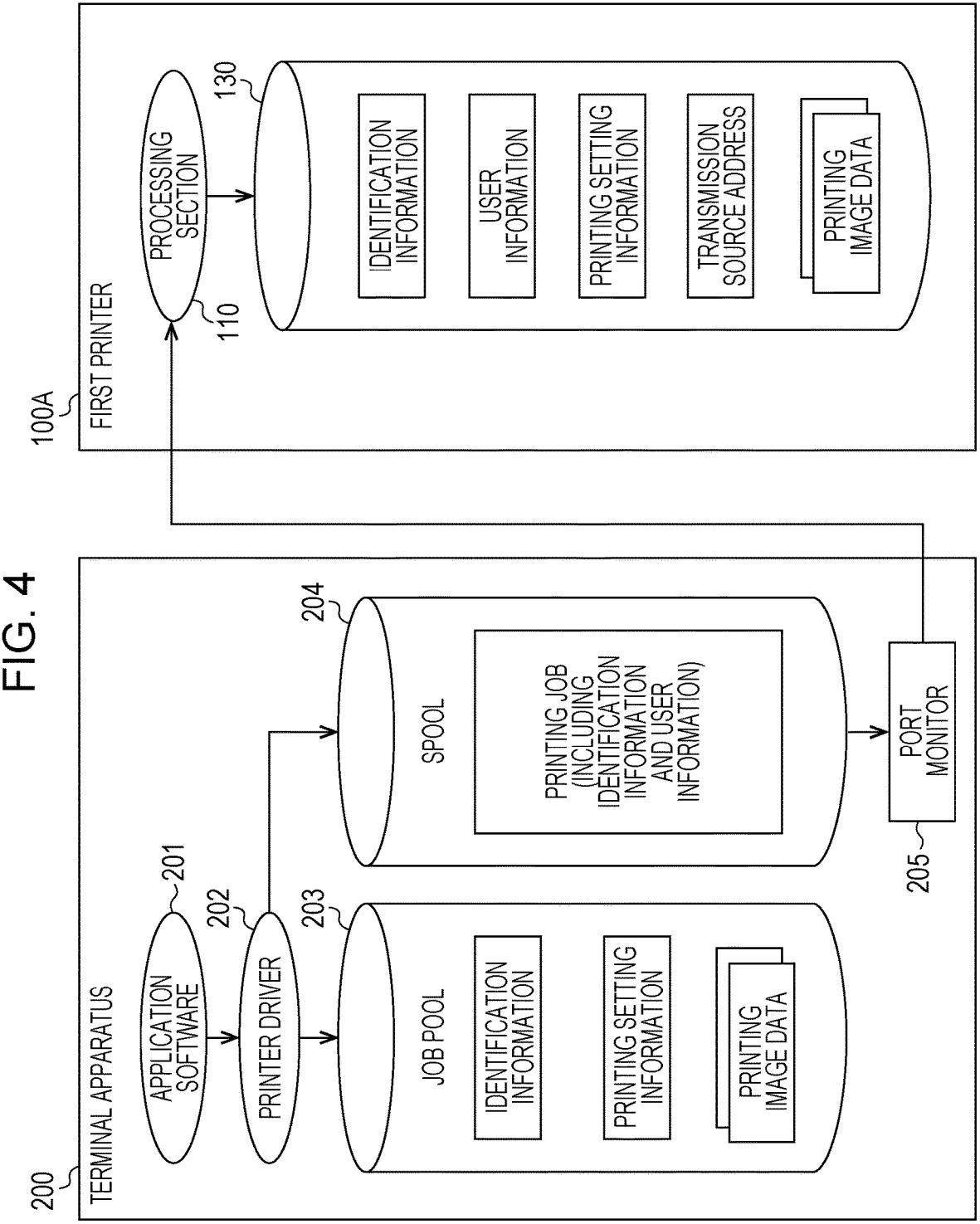
FIG. 4 is a schematic diagram for describing processing that accumulates a printing job.
Figure 5:
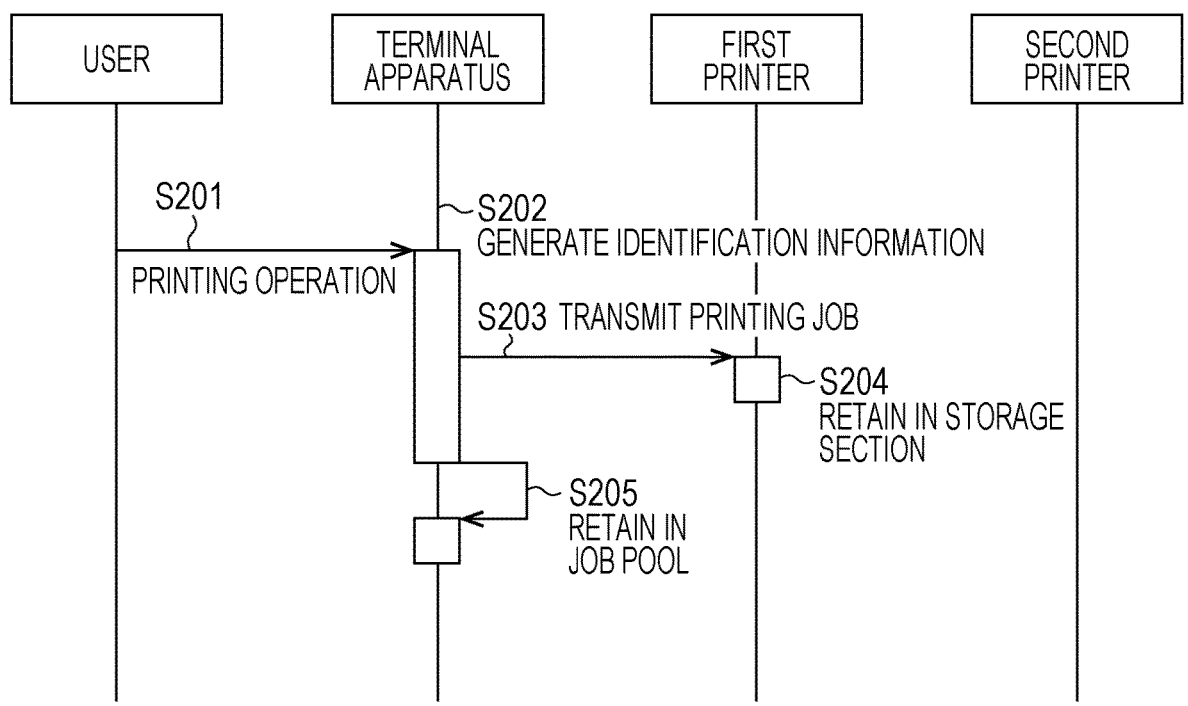
FIG. 5 is a sequence diagram for describing the processing that accumulates the printing job.

Processing that accumulate the printing job that is illustrated in S101 in FIG. 3 is described in detail. FIG. 4 is a schematic diagram for describing the processing that accumulates the printing job. FIG. 5 is a sequence diagram for describing a flow for the processing that accumulates the printing job.

The user performs the printing operation with an application software 201 on the terminal apparatus 200 (S201). The application software 201 is an arbitrary software that possibly runs on an operating system (OS) of the terminal apparatus 200 and possibly performs the printing operation. Specifically, the terminal apparatus 200 includes a processor and a memory, which are not illustrated. Then, the application software 201 is stored in the memory. The processor operates according to the application software 201, and thus functions of the application software 201, which include the printing operation, are realized.

Based on the printing operation, the printer driver 202 of the terminal apparatus 200 generates the printing data and retains the generated printing data in a spool 204 (S202). The printing data here includes identification information on the printing job and user information indicating a user who creates the printing job. The processing that interprets the printing data is performed in the first printer 100A, and thus it is possible that the printing data is converted into data that includes printing setting information and printing image data.

The printing data that is retained in the spool 204 is transmitted to the first printer 100A by way of an interface such as a port monitor 205 (S203). The spool 204 is a memory of the terminal apparatus 200. The port monitor 205 is a communication interface for the printing apparatus 100 that is included in the terminal apparatus 200. The printer driver 202 is an interface that possibly runs on the OS of the terminal apparatus 200. The printer driver 202 is stored in the memory of the terminal apparatus 200. A processor of the terminal apparatus 200 run according to the printer driver 202, and thus functions of the printer driver 202 are realized that include processing which generates the printing data.

The first printer 100A receives the printing data from the terminal apparatus 200 and performs the processing that interprets a printing language in the processing section 110, and then accumulates a result of the interpretation processing in the storage section 130 (S204).

Furthermore, the terminal apparatus 200 retains the printing image data and the identification information on the printing job in a job pool 203 of its own (S205). The job pool 203 is a memory of the terminal apparatus 200. The job pool 203 and the spool 204 may be the same memory and may be different memories.

In FIG. 4, any of information that is accumulated in the job pool 203 of the terminal apparatus 200 and information that is stored in the storage section 130 of the first printer 100A corresponds to the printing job. The printing job, as illustrated in FIG. 4, include the identification information on the printing job, the printing setting information, and the printing image data. The inclusion of the identification information makes suitable processing possible without confusion among the printing jobs in the terminal apparatus 200 and each printing apparatus 100. Furthermore, the printing image data is information for specifying an image that is a target to be printed. The printing setting information includes pieces of information on a size of a printing paper sheet, a color/monochrome setting, a duplex/single printing setting, and the like. Furthermore, the printing setting information, as will be described below in the second embodiment, may include information relating to other settings. The inclusion of the printing setting information and the printing image data in the printing job makes it possible to print a desired image using a desired setting.

Furthermore, the printing job stored in the first printer 100A that is a different printing apparatus 100 includes information for specifying the terminal apparatus 200 that is the transmission source of the printing job. The information for specifying the terminal apparatus 200, for example, is a transmission source address that refers to an address of the terminal apparatus 200 that is the transmission source of the printing job. The transmission source address is an Internet Protocol address (IP address) of the terminal apparatus 200 in a narrow sense, but a different address such as a MAC address may be used. Furthermore, the information for specifying the terminal apparatus 200 is not limited to an address, and a different information peculiar to the apparatus may be used. The inclusion in the printing job of the information for specifying terminal apparatus 200 that is a transmission source makes it possible for the printing apparatus 100 on the printing performing side to select the terminal apparatus 200 as the acquisition destination of the printing job. For example, when the second printer 100B determines the printing job accumulated in the first printer 100A as an execution-target job, it is possible that the execution-target job is acquired from the terminal apparatus 200.

Furthermore, the printing job stored in the first printer 100A that is a different printing apparatus 100 includes the user information for specifying the user who creates the printing job. The inclusion of the user information in the printing job makes the authentication printing and can suppress the carrying-away or mistaking of the result of the printing. The user information, for example, is information that is added when the printing data is generated by the printer driver 202.

2.3 Displaying of Job Selection Screen and Making Selection

Figure 6:
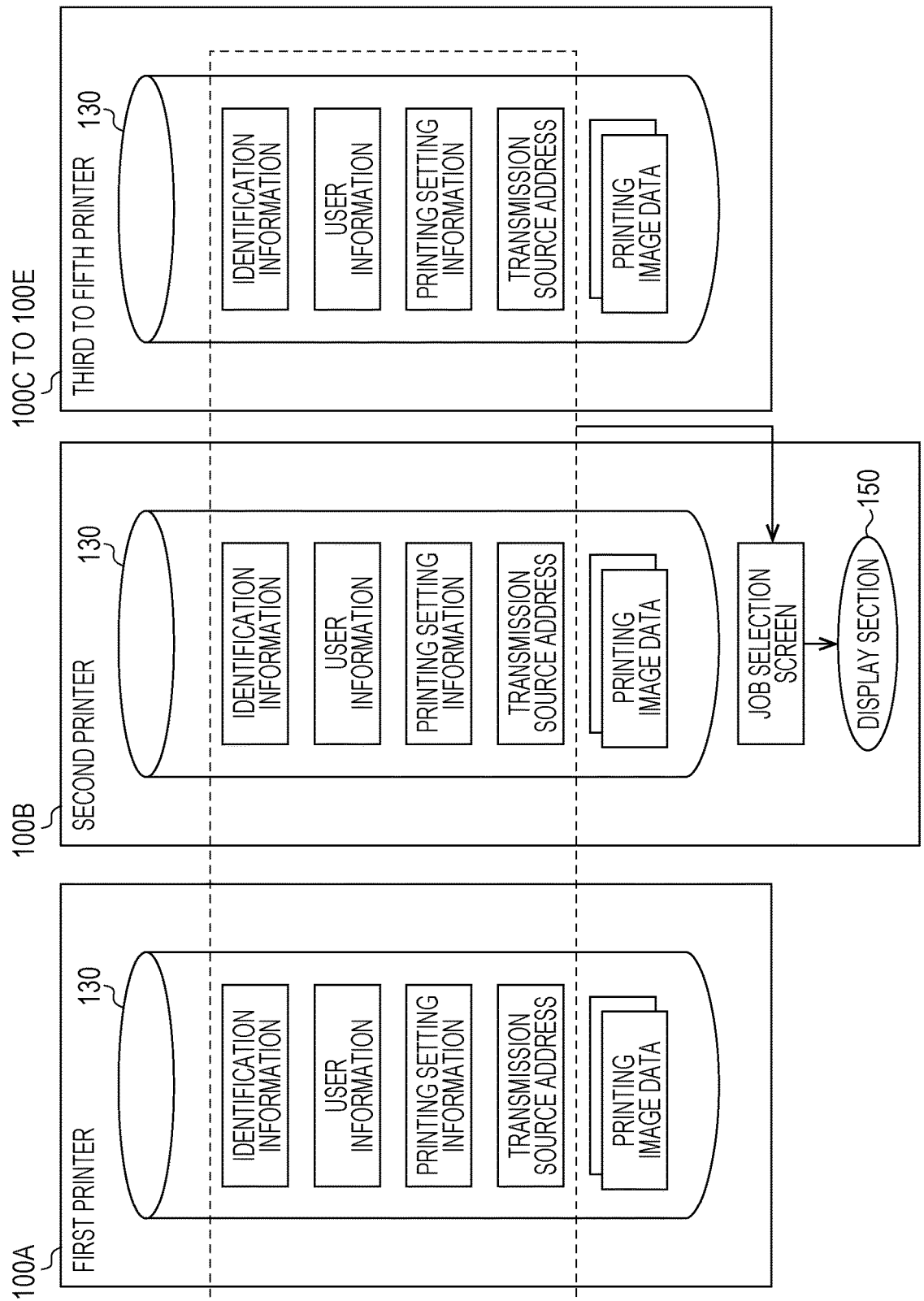
FIG. 6 is a schematic diagram for describing processing that acquires and displays information relating to the printing job.
Figure 7:
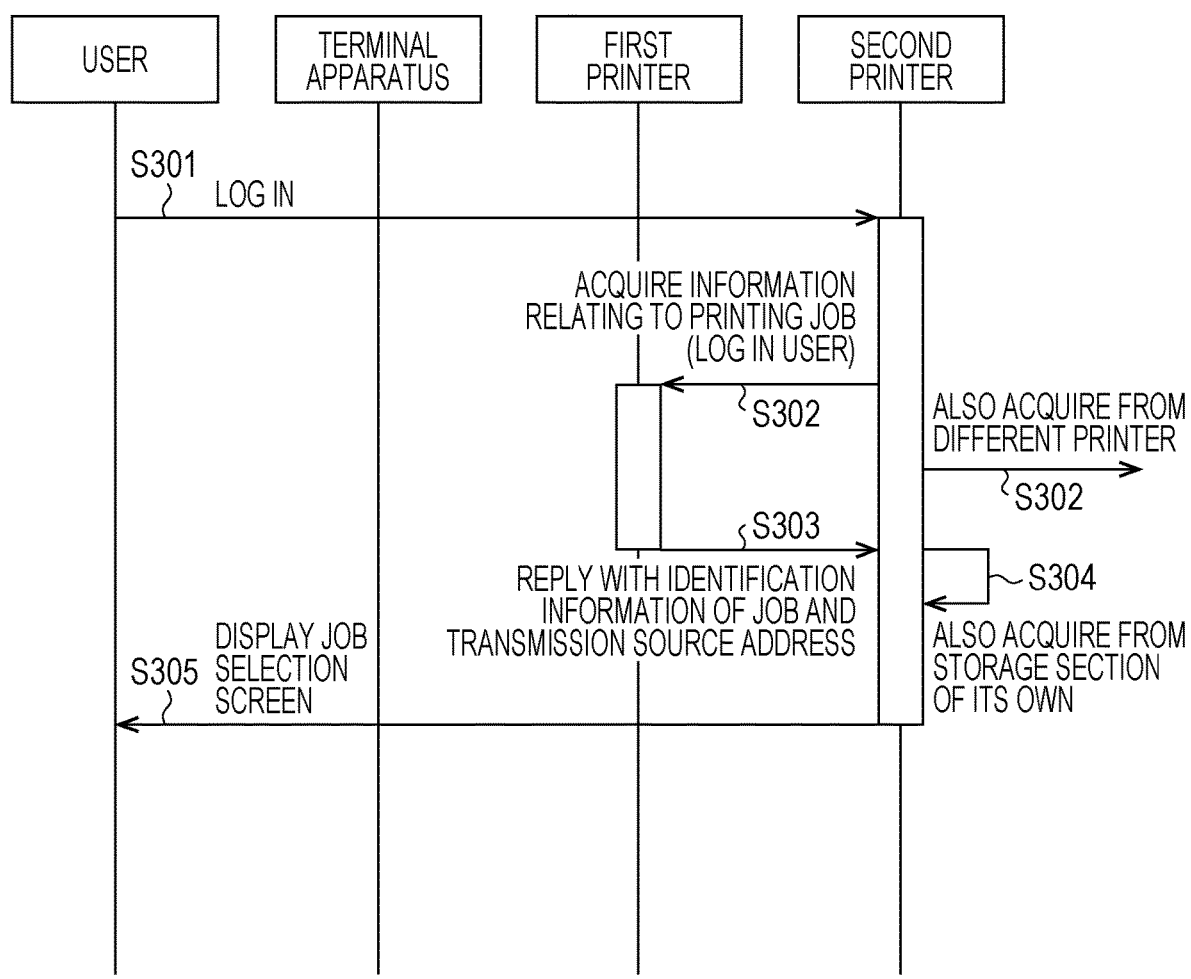
FIG. 7 is a sequence diagram for describing the processing that acquires and displays the information relating to the printing job.

Processing that acquires the information relating to the printing job illustrated in S102 in FIG. 3 and processing that displays the job selection screen are described in detail. FIG. 6 is a schematic diagram for describing the processing that acquires the information relating to the printing job and the processing that displays the job selection screen. FIG. 7 is a sequence diagram for describing a flow for the processing.

The user performs the log-in operation in the second printer 100B that is the printing apparatus 100 that is desired to perform printing (S301). For example, the log-in operation in S301, as described above, is an authentication operation of shading the card reader with the authentication card.

The second printer 100B makes an inquiry to the first printer 100A, the third printer 100C, the fourth printer 100D, and the fifth printer 100E, which are the printing apparatuses 100 that share the printing job, as to whether or not the printing job of the user who logs in is present. In a broad sense, the printing apparatus 100 to which the user logs in makes an inquiry to a printing apparatus 100 other than the printing apparatus 100 itself, which is included in a group that shares the printing job (S302). The processing in S302, the second printer 100B makes an inquiry, with the user information indicating the user who logs in being set as a keyword.

When a printing job of a target user is accumulated, each printer other than the second printer 100B replies with the information relating to the printing job (S303). Specifically, the user information is acquired from the second printer 100B, and, when user information included in a printing job is determined as being the same as the acquired user information, information relating to such a printing job is transmitted as a response. It is noted that in the processing in S303, when each printer other than the second printer 100B replies with the printing job including the printing image data, a load on each printer increases. Consequently, as illustrated in FIG. 6, in the processing in S303, the second printer 100B acquires data that results from excluding at least the printing image data from the printing job.

Specifically, because there is a need to uniquely identify the printing job, the second printer 100B acquires the identification information on the printing job. Furthermore, the second printer 100B assumes a case where the printing job is acquired from the terminal apparatus 200 that is a transmission source, and acquires a transmission source address. In the second embodiment that will be described below, in order to determine whether or not the printing on each printing job is possibly performed, the second printer 100B need to acquire a printing setting information. However, in the present embodiment, it is possible that the acquisition of the printing setting information at the time in S303 is omitted. Furthermore, the user information is information that is used for user inquiry processing in each printer other than the second printer 100B, and the acquisition of the user information is omissible in the second printer 100B. However, pieces of information relating to all printing jobs may be acquired from a different printer, and inquiry processing may be made as to whether the user information is the same in the second printer 100B. In such a case, the second printer 100B needs to acquire the user information from a different printer.

It is noted that, in the second embodiment that will be described below, in some cases, the second printer 100B makes the third determination relating to a data format of the printing image data of each printing job. For that reason, in the processing in S303, the second printer 100B is not prevented from acquiring the printing image data of the printing job. However, considering the load on each printer, it is not preferable that the second printer 100B acquires all pieces of printing image data. For example, in the processing in S303, the second printer 100B acquires metadata indicating the data format of the printing image data, or one or several pieces of data that are among pieces of printing image data.

Furthermore, the second printer 100B also acquires information on the printing job from the storage section 130 of its own (S304). This is to sufficiently consider a case where the printing apparatus 100 to which the printing job is transmitted from the terminal apparatus 200 and the printing apparatus 100 to which the user logs in are the same.

After acquiring the information relating to the printing job, the second printer 100B displays a screen for the user to select the execution-target job that is a target to be printed from among the acquired printing jobs, on the display section 150 (S305). That is, the processing section 110 of the printing apparatus 100 acquires the information relating to the printing job accumulated in the storage section 130, and the information relating to the printing job accumulated in a different printing apparatus 100, and, based on the acquired information, performs processing that displays the job selection screen on the display section 150. The job selection screen, for example, is a screen on which the acquired printing job is displayed in a list format. However, the job selection screen may be a screen from which one or multiple printing jobs are selectable as the execution-target job, and is not limited to the screen for displaying in a list format. The displaying of the job selection screen makes it possible to urge the user to select the execution-target job.

It is noted that the processing section 110 may determine periodically whether or not the communication section 120 possibly communicates with a different printing apparatus 100. Then, the processing section 110 performs processing that excludes a different printing apparatus 100 determined as being incommunicable, as a target from which the information relating to the printing job is acquired. If this is done, a request for the information relating to the printing job can be suppressed from being made to the incommunicable printing apparatus 100. For example, when the request for the acquisition of the information relating to the printing job is made to the incommunicable printing apparatus 100, because waiting occurs until a timeout is detected, there is a concern that the time from when the user logs in S301 to when the job selection screen is displayed in S305 will be lengthened, thereby making the user feel stressful. In this respect, the prior checking of a state of each printing apparatus 100 in the background can limit a target capable of processing in S302 to the communicable printing apparatus 100. Because of this, it is possible that the time from when the users logs in to when the job selection screen is displayed is shortened.

2.4 Processing that Acquires and Prints Printing Data

The printing apparatus 100 according to the present embodiment may acquire the execution-target job from the terminal apparatus 200 and may acquire the execution-target job from a different printing apparatus 100. Two types of specific techniques are considered. For example, the processing section 110 of the printing apparatus 100 performs processing that determines from which one of a different printing apparatus 100 and the terminal apparatus 200 the execution-target job is acquired. In this case, the processing section 110 performs processing that acquires the execution-target job from any one apparatus that is determined. Alternatively, the processing section 110 transmits a request for acquisition of the execution-target job to both a different printing apparatus 100 and terminal apparatus 200. In a technique that performs the determination processing, because the target from which the information relating to the printing job is acquired is one apparatus, there is an advantage of being capable of simplifying the acquisition processing without communication band. On the other hand, for example, although one apparatus is in an incommunicable state, because the processing that transmits the acquisition request does not need to wait a timeout, there is an advantage of being capable of acquiring the execution-target job at a high speed. Each of the techniques will be described in detail below.

2.4.1 Transmission of Acquisition Request to Any One Apparatus

Figure 8:
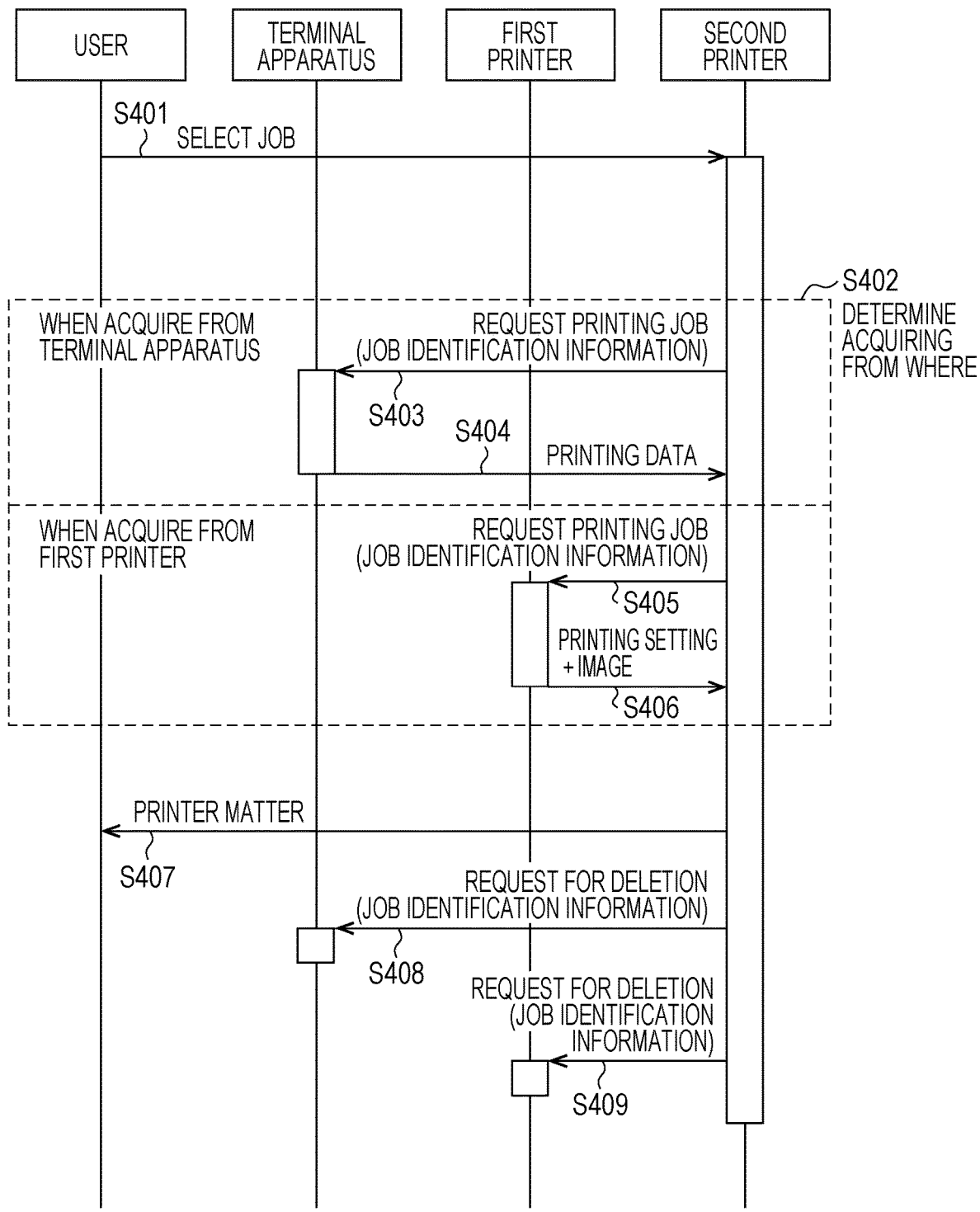
FIG. 8 is a sequence diagram for describing printing processing in a first embodiment.

A technique that performs the processing that determines whether or not to acquire the execution-target job from any one apparatus is described. FIG. 8 is a sequence diagram for describing a flow for the printing processing in S103 that is performed when performing the determination processing.

First, the processing section 110 of the second printer 100B receives an input that is selected by the user from the job selection screen. Then, the processing section 110 determines the selected printing job as the execution-target job (S401). If this is done, it is possible that the execution-target job is suitably determined using the job selection screen.

The processing section 110 performs the processing that determines from which one of the first printer 100A and the terminal apparatus 200 the execution-target job is acquired (S402). The processing in S402 will be described in detail below with reference to FIG. 11.

When the processing which determines that the execution-target job is acquired from the terminal apparatus 200, the second printer 100B transmits the request for the acquisition of the execution-target job to the terminal apparatus 200 (S403), and the terminal apparatus 200 replies with the execution-target job (S404).

Figure 9:
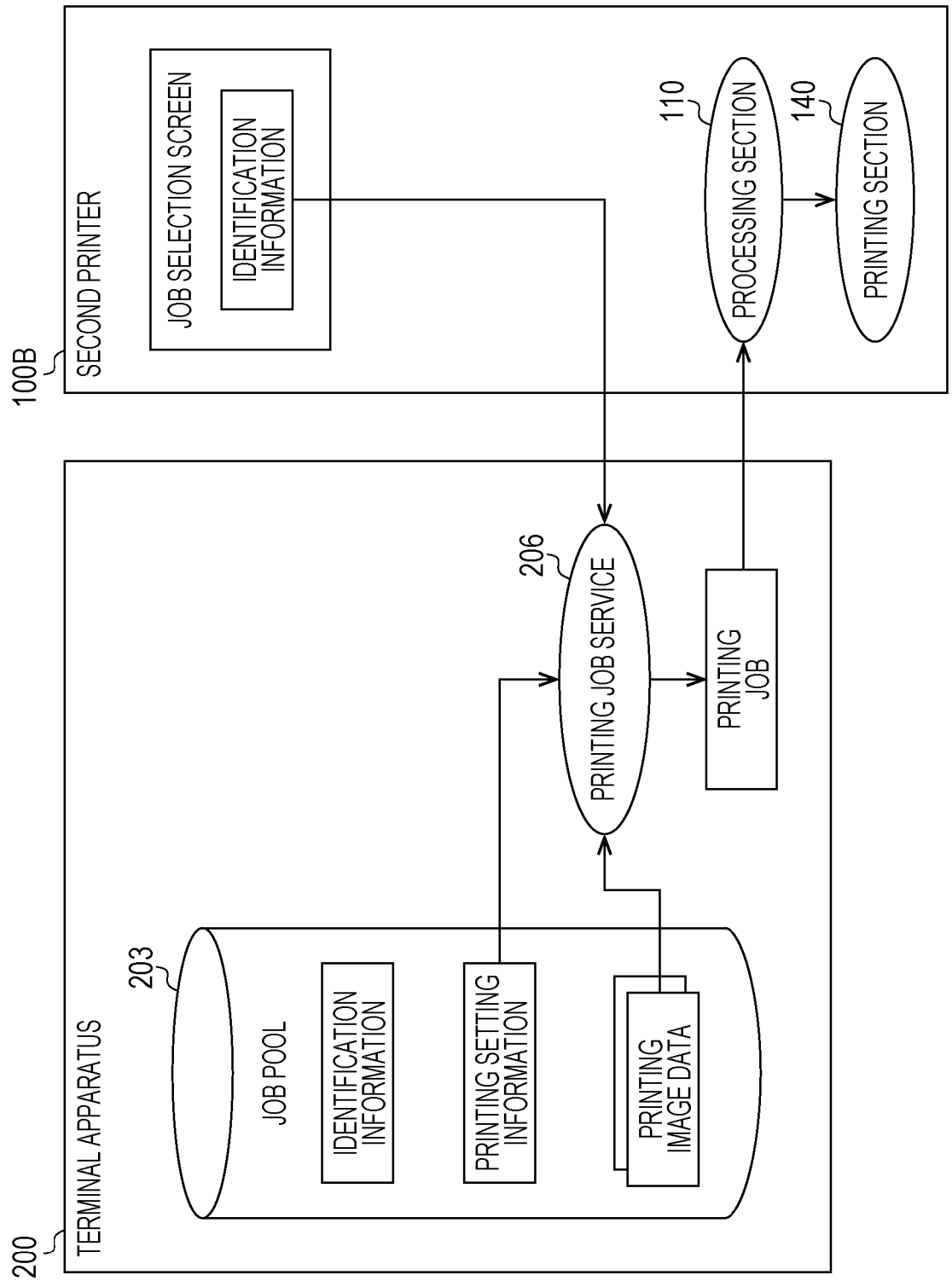
FIG. 9 is a schematic diagram for describing the processing that performs printing on the printing job acquired from a terminal apparatus.

FIG. 9 is a schematic diagram for describing the processing in each of S403 and S404. As illustrated in FIG. 9, the second printer 100B specifies identification information on the execution-target job that is determined based on the job selection screen, and transmits the acquision request including the identification information to the terminal apparatus 200. A printing data service 206 of the terminal apparatus 200 acquires the printing setting information and the printing image data, which are associated with the acquired identification information, from the job pool 203. Then, the printing data service 206 generates the printing data based on the acquired printing setting information and printing image data and transmits the acquired printing data to the second printer 100B.

At this point, the printing data service 206 is software that possibly runs on the OS of the terminal apparatus 200. The printing data service 206 is stored in the memory of the terminal apparatus 200, and a processor of the terminal apparatus 200 operates according to the printing data service 206. Thus, each function of the printing data service 206 that includes the processing that generates the printing data is realized. The printing data here, for example, is data that is described using a page description language which is interpretable in the second printer 100B. In terms of generating the printing data, because the printing data service 206 and the printer driver 202 has the same function, and, because of this, may be realized as the same software. However, whereas the printer driver 202 generates the printing data based on information from the application software 201, the printing data service 206 generates the printing data based on information from the job pool 203. For that reason, the printing data service 206 and the printer driver 202 may be realized as different pieces of software.

The second printer 100B receives the printing data from the terminal apparatus 200, and performs the processing that interprets the printing language in the processing section 110, then prints a result of the interpretation processing using the printing section 140, thereby providing a result of the printing to the user (S407).

As described above, when the execution-target job is acquired from the terminal apparatus 200, it is possible that the printing data matched to the second printer 100B on the terminal apparatus 200 side is generated. For that reason, although the first printer 100A that first acquires the execution-target job and the second printer 100B are of different types, it is possible that printing is suitably performed. In other words, the acquisition of the execution-target job from the terminal apparatus 200 is made possible, and thus it is possible that not only is a reduction in the printing performance suppressed, but cooperation among different types of apparatuses are also made easy.

On the other hand, when the execution-target job is acquired from the first printer 100A that is a different printing apparatus 100, the second printer 100B transmits the request for the acquisition of the execution-target job to the first printer 100A (S405), and the terminal apparatus 200 replies with the execution-target job (S406).

Figure 10:
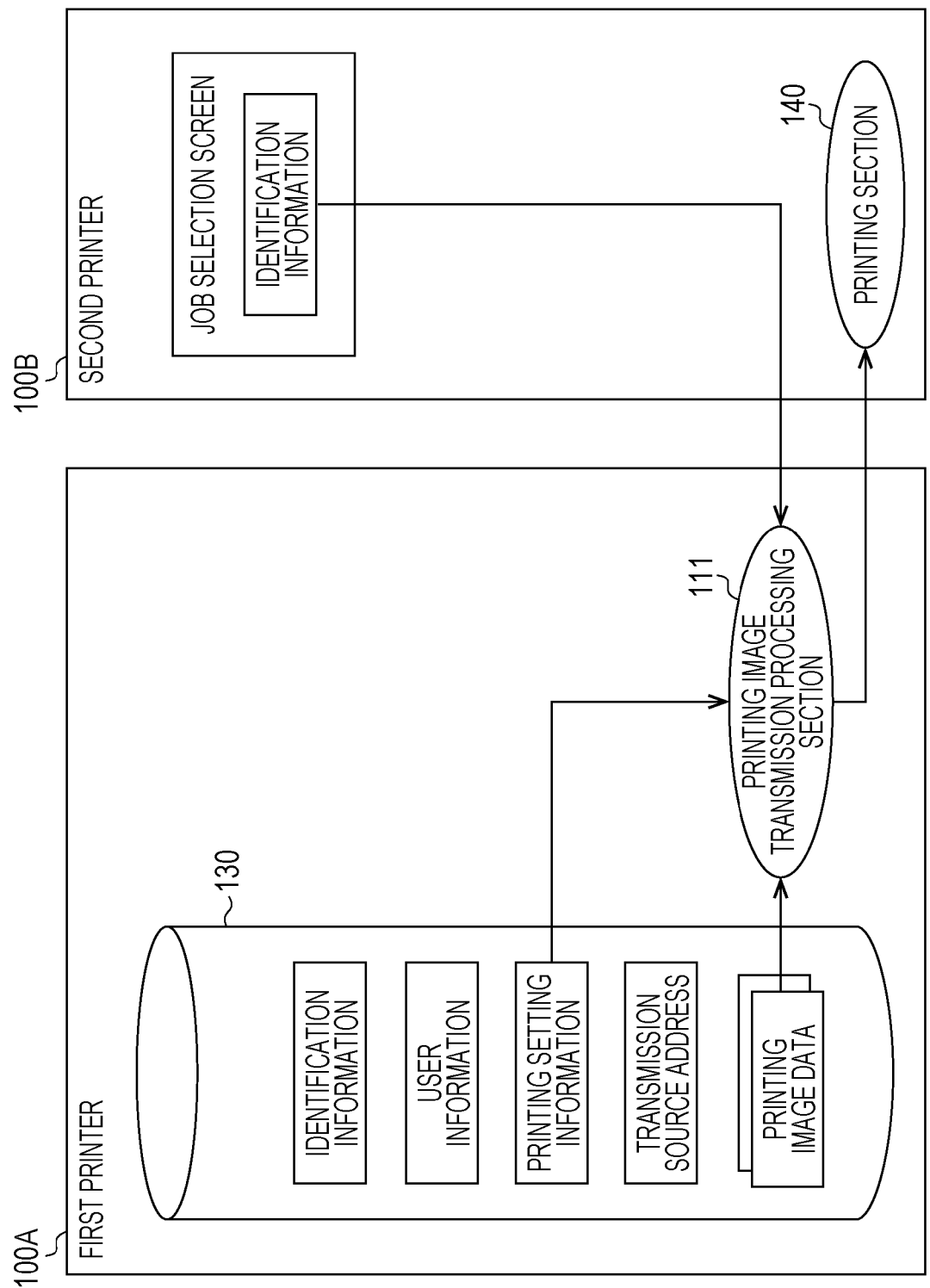
FIG. 10 is a schematic diagram for describing the processing that prints the printing on the printing job acquired from a different printing apparatus.

FIG. 10 is a schematic diagram for describing the processing in each of S405 and S406. As illustrated in FIG. 10, the second printer 100B specifies the identification information on the execution-target job that is determined based on the job selection screen, and transmits the acquisition request including the identification information to a printing image transmission processing section 111 of the first printer 100A. A printing image transmission processing section 111, for example, is included in the processing section 110 of the first printer 100A. The printing image transmission processing section 111 of the first printer 100A acquires the printing setting information and the printing image data, which are associated with the acquired identification information, from the storage section 130 of its own. Then, the printing image transmission processing section 111 transmits the acquired printing setting information and printing image data to the second printer 100B.

The second printer 100B receives the printing job, which is the printing setting information and the printing image data, from the first printer 100A, and performs the printing one the received printing job, using the printing section 140, thereby provides a result of the printing to the user (S407).

As described above, when the execution-target job is acquired from the first printer 100A that is a different printing apparatus 100, the execution-target job is equivalent to a result of the first printer 100A performing the interpretation processing on the printing data for the first printer 100A. For that reason, when the first printer 100A and the second printer 100B are not of the same type of apparatus, in some cases, a desired result of the printing cannot be acquired.

The description is continued with reference again to FIG. 8. When it is determined that the printing section 140 completes processing that performs printing on the execution-target job, that is, after the processing in S407, the processing section 110 of the second printer 100B transmits a request for deletion of the execution-target job to the first printer 100A that is a different printing apparatus 100, and the terminal apparatus 200 (S408 and S409). The request for the deletion in S408 and S409 is transmitted in a state of being associated with the identification information on the execution-target job.

The terminal apparatus 200 deletes the printing job associated with the designated identification information from the job pool 203. Furthermore, the first printer 100A deletes the printing job associated with the designated identification information from the storage section 130 of its own. If this is done, when the processing that performs printing on a given printing job is completed, it is possible that each apparatus which accumulates the printing job is caused to suitably perform the deletion of the printing job.

It is noted that in a technique according to the present embodiment finds application in the printing system 10 that includes the printing apparatus 100 that is, for example, the second printer 100B, a different printing apparatus 100 that is, for example, the first printer 100A, and the terminal apparatus 200. As illustrated in FIG. 4, when the printing job is transmitted to a different printing apparatus 100, the terminal apparatus 200 accumulates the transmitted printing job in a storage unit of the terminal apparatus 200. The storage unit, for example, is the job pool 203. The information that is accumulated in the job pool 203 and the printing data that is transmitted to the first printer 100A may have different formats, and in the present embodiment, as described above, any information is expressed as the printing job.

Then, when the terminal apparatus 200 is restarted, the terminal apparatus 200 acquires the information relating to the printing job that is accumulated by a different printing apparatus 100, from the different printing apparatus 100. Then, when a different printing apparatus 100 does not accumulate the printing job transmitted from the terminal apparatus 200, the printing job transmitted to the different printing apparatus 100 may be deleted from the storage unit of the terminal apparatus 200.

As described above, there is a probability that the terminal apparatus 200 will be powered off or be disconnected form a network, when compared with the printing apparatus 100. For that reason, there is a concern that the terminal apparatus 200 will not receive the deletion request that is illustrated in S408. When the printing job, the printing on which is completed, cannot be deleted, this is not preferable because the terminal apparatus 200 continues to accumulate data that is at a high-level necessity, in the job pool 203. In this respect, the terminal apparatus 200 makes an inquiry to the printing apparatus 100 that is a transmission destination of the printing job, at a given timing, and thus it is determined whether or not the printing of the printing job is completed. If the printing job is deleted from the printing apparatus 100, because it can be determined that the printing of the printing job is completed, the terminal apparatus 200 deletes the printing job from the job pool 203 of its own. It is noted that, because a case is considered as a typical situation where the deletion request cannot be received, when the terminal apparatus 200 is restarted, by making an inquiry to the printing apparatus 100, it can be determined whether or not the printing job is deleted at a suitable timing. Furthermore, the terminal apparatus 200 has a high probability of being periodically restarted, and the deletion determination is made at the time of the restarting. Thus, it is possible that the job, the printing on which is completed, is suppressed from being left undeleted for a long period of time.

Figure 11:
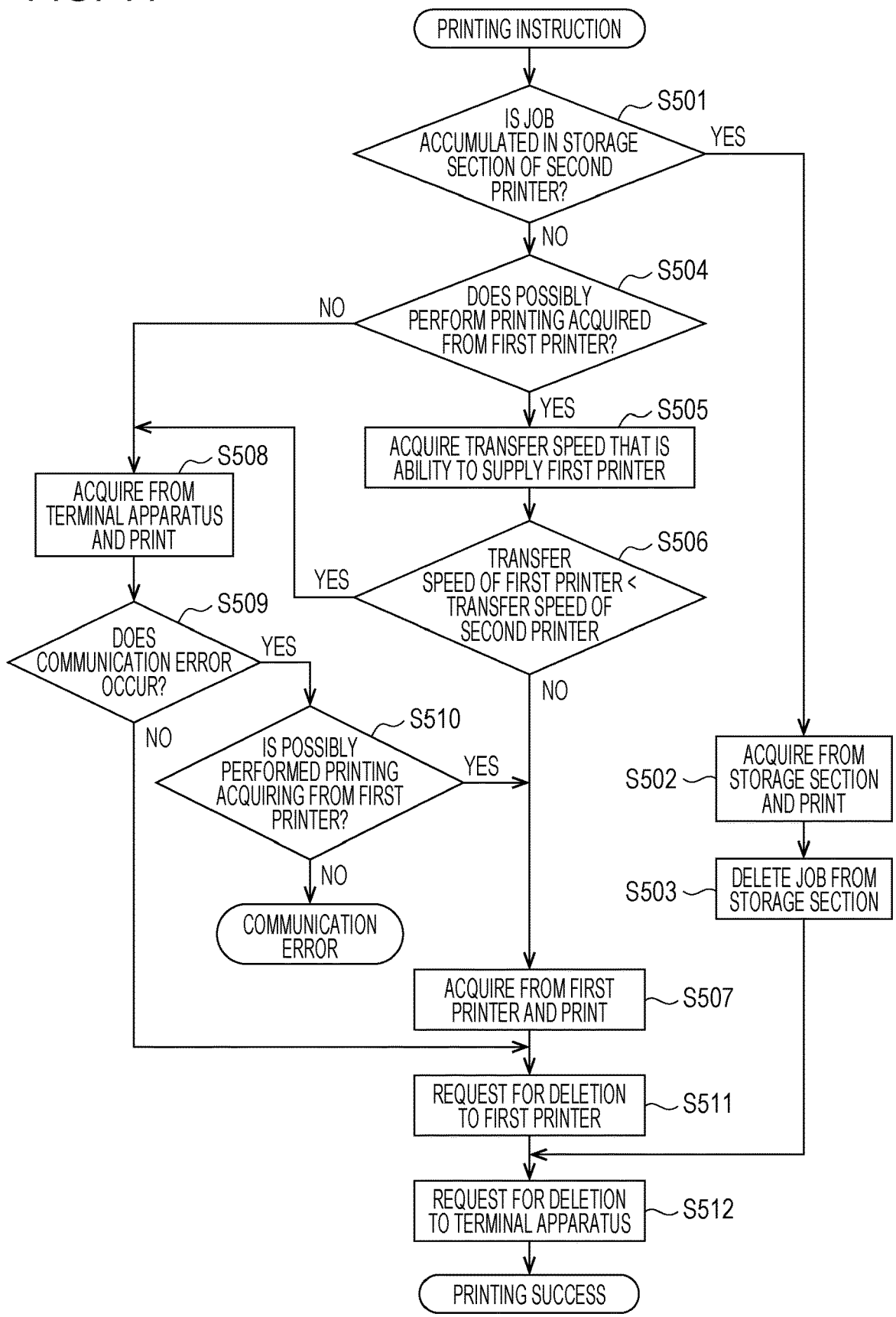
FIG. 11 is a flowchart for describing processing in the printing apparatus that performs the printing.

FIG. 11 is a flowchart for describing processing by the second printer 100B, which corresponds to S402 to S409 in FIG. 8. When this processing is started, the processing section 110 of the second printer 100B determined whether or not the execution-target job is the printing job that is accumulated in the storage section 130 of its own (S501). When the result is Yes in S501, the user performs the printing operation in the printing apparatus 100 that transmits the printing job. Because the second printer 100B does not need to acquire the execution-target job from a different apparatus, and, because of this, acquires the execution-target job from the storage section 130 of its own and performs the printing on the acquired execution-target job (S502). Thereafter, the processing section 110 deletes the execution-target job from the storage section 130 (S503). Furthermore, the request for the deletion of the corresponding printing job is transmitted to the terminal apparatus 200 that is a transmission source of the execution-target job (S512) and the processing is ended.

When the result is No in S501, the processing section 110 of the second printer 100B determines whether or not the execution-target job is acquirable from a different printing apparatus 100 (S504). At this point, the first printer 100A is assumed to be a different printing apparatus 100. In the present embodiment, the determination in S504 is a determination of whether or not the first printer 100A and the second printer 100B are of the same type of apparatus. When the two printers are of the same type of apparatus, the processing section 110 of the second printer 100B determines that the printing on the printing job accumulated in the first printer 100A is possibly performed in the printing section 140 of its own.

When it is determined that it is possible that the execution-target job is acquired from the first printer 100A and that the printing on the acquired execution-target job is performed (Yes in S504), the processing section 110 of the second printer 100B acquires information indicating the transfer ability of the first printer 100A (S505). The transfer ability may be replaced with the ability to supply the printing job. The information indicating the transfer ability is specifically a parameter indicating a transfer speed at which the first printer 100A transfers the printing job to the second printer 100B. The transfer speed of the first printer 100A is determined based on various factors, such as a maximum communication speed of the first printer 100A, a communication speed at which the first printer 100A already performs communication with an apparatus other than the second printer 100B, a speed at which data is read from the storage section 130 of the first printer 100A, and a processing speed of the processing section 110 of the first printer 100A. The first printer 100A acquires parameters indicating these, and, based on the parameters, computes a parameter indicating an estimated speed at which the execution-target job is transferred from the first printer 100A to the second printer 100B. Alternatively, the estimated transfer speed may be computed on the first printer 100A side, and the second printer 100B may acquire a parameter indicating a result of the computation.

Furthermore, the processing section 110 of the second printer 100B acquires a parameter indicating a printing speed of the printing section 140 of its own. The parameter indicating the printing speed is information indicating a size of data that is printable per unit time and, for example, is a maximum printing speed that is determined as a specification. Then, the processing section 110 performs the processing that determines from which one of a different printing apparatus 100 and the terminal apparatus 200 the execution-target job is acquired, based on a parameter indicating a speed at which the printing on the execution-target job is performed by the printing section 140 and on a parameter indicating a speed at which the execution-target job is transferred by the different printing apparatus 100. If this is done, based on the ability of each printing apparatus 100, it is possible that an apparatus that makes a request for the acquisition of the execution-target job is determined.

Specifically, it is determined whether or not speed for transfer from first printer 100A<printing speed of second printer 100B (S506). When the result in S506 is No, a speed at which the execution-target job is transferred from the first printer 100A is not a bottleneck for printing, and it is possible that the printing performance of the second printer 100B is sufficiently brought into play. Consequently, the processing section 110 acquires the execution-target job from the first printer 100A and performs the printing on the acquired execution-target job (S507).

After the printing is completed, the processing section 110 transmits the request for the deletion of the execution-target job to each of the first printer 100A and the terminal apparatus 200 (S511 and S512), and then the processing is ended.

When the printing on the execution-target job accumulated in the first printer 100A cannot be performed in the second printer 100B due to a difference in a type of apparatus (No in S504), the processing section 110 acquires the execution-target job from the terminal apparatus 200 and performs the printing on the acquired execution-target job (S508). When the printing performance decreases due to a primary cause, that is, the speed for the transfer from the first printer 100A (Yes in S506), in the same manner, the processing section 110 also acquires the execution-target job from the terminal apparatus 200 and performs the printing on the acquired execution-target job.

However, when making a request for the execution-target job, in some cases, the terminal apparatus 200 is powered off or is disconnected from a network. Alternatively, there is a concern that the terminal apparatus 200 will be powered off at a stage where the transfer of the execution-target job is in progress or will be disconnected from a network. Consequently, when the processing in S508 is performed, the processing section 110 determines whether or not all execution-target jobs can be normally received or whether or not a communication error occurs (S509). When the communication error does not occur (No in S509), because the printing is normally completed, the processing section 110 transmits the request for the deletion of the printing job to the first printer 100A and the terminal apparatus 200 (S511 and S512) and ends the processing.

When the communication error occurs (Yes in S509), the processing section 110 determines whether or not the printing on the execution-target job accumulated in the first printer 100A is possibly performed in the printing section 140 of its own (S510). In the determination in S510, the result of the determination in S504 is also usable. When it is determined that the printing is possibly performed (Yes in S510), the processing section 110 acquires the execution-target job from the first printer 100A and performs the printing on the acquired execution-target job (S507). When it is determined that the printing can be performed (No in S510), because no apparatus can suitably acquire the execution-target job, the processing is ended in an abnormal mode due to the communication error.

As described above, the processing section 110 of the second printer 100B determines whether or not the execution-target job is acquirable from the terminal apparatus 200, and, when it is determined that the execution-target job cannot be acquired, acquires the execution-target job from the first printer 100A that is a different printing apparatus 100. Specifically, the result of the determination in S509 and S510 is Yes, and thus processing to processing to S507 takes place. If this is done, when an execution-target job cannot be acquired from the terminal apparatus 200, it is also possible that the processing that performs the printing on the execution-target job is continued.

Furthermore, when it is determined that the execution-target job cannot be acquired from the first printer 100A that is a different printing apparatus 100, the processing section 110 of the second printer 100B performs error processing. Specifically, when the result of the determination in S510 is No, the processing is ended in the abnormal mode. If this is done, when the execution-target job cannot be acquired from any one of the first printer 100A and the terminal apparatus 200, it is possible that the error processing is suitably performed. It is noted that the error processing is processing that reports the detail of an error to the user, but no limitation to this is imposed. For example, the error processing may be reporting processing that urges the user to performs printing in other printing apparatus 100, such as the third printer 100C to the fifth printer 100E. However, as illustrated in S504 and S510, the printing apparatus 100 that provides an instruction to perform printing needs to be of the same type of apparatus as the first printer 100A. Consequently, it is desirable that the error processing here is set to be the reporting processing that urges the user to perform printing in an apparatus that is the same in type as the first printer 100A. The reporting processing may display a text message "Please perform printing in an apparatus that is the same in type as the first printer 100A". Alternatively, the reporting processing may display a text message "Please perform printing in a x-th printer", which specifies a specific printing apparatus 100. Furthermore, the reporting processing is not limited to the displaying of the text message, and various modification implementations are possible.

Furthermore, as described above, at a timing in S504, it is determined whether or not the printing on the printing job accumulated in the first printer 100A is possibly performed by the printing section 140 of the second printer 100B, that is, whether or not the first printer 100A and the second printer 100B are of the same type of apparatus. However, the flow for the processing is not limited to this. For example, when the job selection screen is displayed, the second printer 100B may determine whether or not each printing apparatus and the second printer 100B are of the same type of apparatus. Then, the second printer 100B sets only the information relating to the printing job acquired from the printing apparatus 100 that is the same in type as the second printer 100B, which are among pieces of information relating to the collected printing jobs, to be a target for displaying on the job selection screen. If this is done, the job selection screen selected from the execution-target job is limited to the printing job, the printing on which is possible in the printing section 140 of the second printer 100B. In this case, Steps S504 and S510 are omitted from the flowchart in FIG. 11. When the result of the determination in S501 is No, the processing in S505 is performed. When the result of the determination in S509 is Yes, the processing in S507 is performed.

2.4.2 Transmission of Acquisition Requirement to Both Apparatuses

Figure 12:
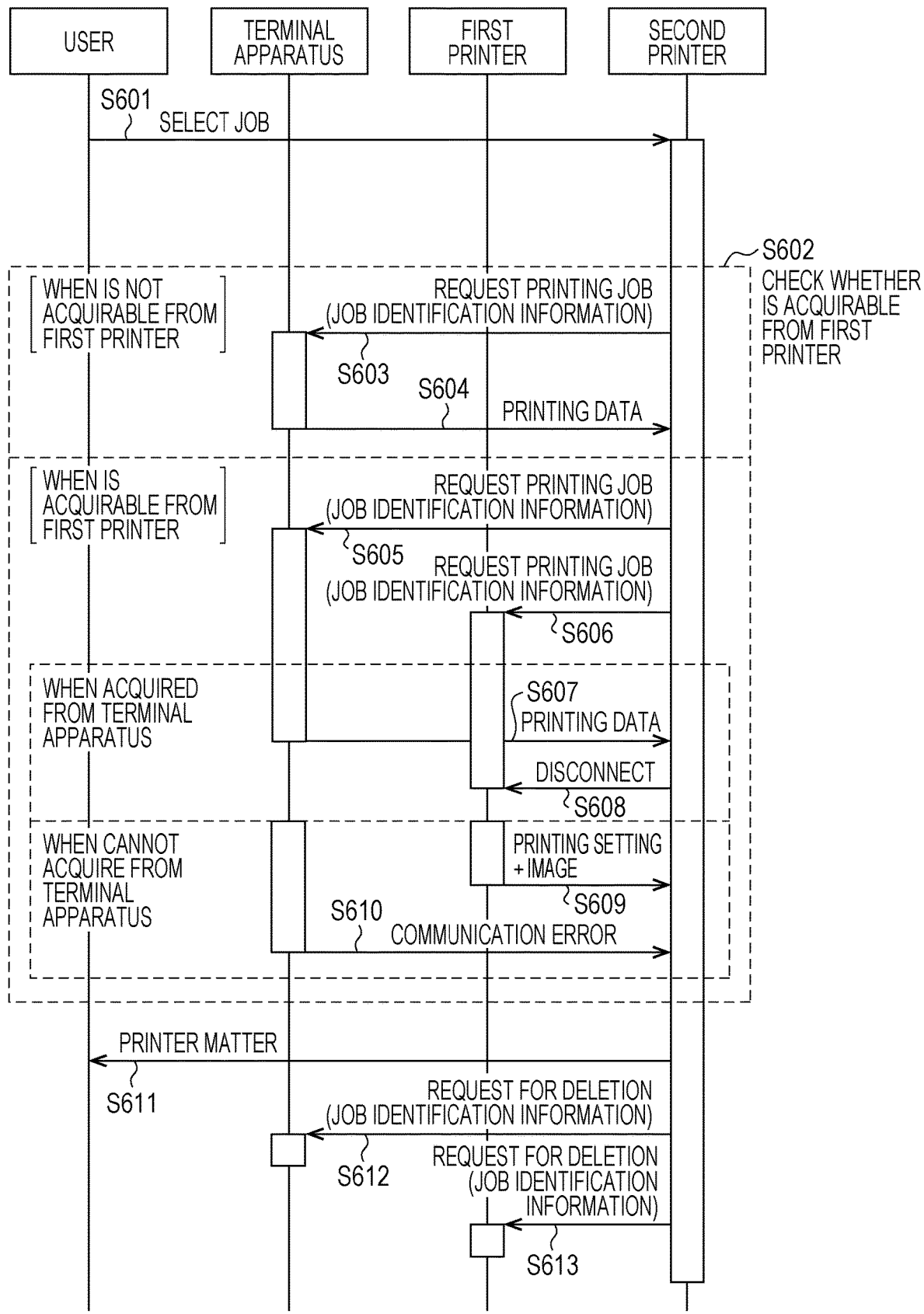
FIG. 12 is a sequence diagram for describing different printing processing in the first embodiment.

Next, a technique in which the processing section 110 of the second printer 100B transmits the request for the acquisition of the execution-target job to both the first printer 100A and the terminal apparatus 200. FIG. 12 is a sequence diagram for describing the flow for the printing processing in S103 when the request for the acquisition of the execution-target job is transmitted to both the first printer 100A and the terminal apparatus 200.

First, the processing section 110 of the second printer 100B receives an input that is selected by the user from the job selection screen. Then, the processing section 110 determines the selected printing job as the execution-target job (S601).

The processing section 110 determines whether or not the printing on the printing job accumulated in the first printer 100A is possibly performed in the printing section 140 of its own (S602). In the same manner as in S504, this processing determines whether or not the first printer 100A and the second printer 100B are of the same type of apparatus.

When it is determined that the printing cannot be performed, the acquisition of the execution-target job from the first printer 100A is meaningless. The second printer 100B transmits the request for the acquisition of the execution-target job to the terminal apparatus 200 (S603) and the terminal apparatus 200 replies with the execution-target job (S604). The processing in S603 and S604 is as illustrated in S403 and S404 in FIG. 8 and illustrated in FIG. 9. It is noted that, although omitted from FIG. 12, when the communication with the terminal apparatus 200 is in error, the second printer 100B performs the error processing. Furthermore, S611 to S613 that are processing operations that are to be performed after acquiring the execution-target job are the same as S407 to S409 in FIG. 8.

When the printing is possibly performed, the second printer 100B transmits the request for the acquisition of the execution-target job to both the terminal apparatus 200 and the first printer 100A (S605 and S606). When the terminal apparatus 200 normally receives the acquisition request, as illustrated in FIG. 9, processing that reads information from the job pool 203, the processing that generates the printing data, and processing that performs transmission to the second printer 100B are performed. When the first printer 100A normally receives the acquisition request, as illustrated in FIG. 10, the processing that reads information in the storage section 130 and the processing that performs the transmission to the second printer 100B.

However, the information that is transmitted from the terminal apparatus 200 and the information that is transmitted from the first printer 100A are pieces of information that may be different in data format from each other, but indicate the same printing job. For that reason, when the second printer 100B continues to acquire the execution-target job from both apparatuses, redundant pieces of data occur. This redundancy is inefficient. Furthermore, the execution-target job continues to be acquired from the first printer 100A, and thus a load on the first printer 100A increases.

Consequently, when the terminal apparatus 200 starts to transfer the execution-target job (S607), the processing section 110 of the second printer 100B stops the processing that acquires the execution-target job from the first printer 100A that is a different printing apparatus 100 (S608). If this is done, the execution-target job can be suppressed from being acquired in a redundant manner. On that occasion, the interruption of communication with the first printer 100A makes it possible to acquire the execution-target job from the terminal apparatus 200 that has a high transfer capability.

On the other hand, when the execution-target job cannot be acquired from the terminal apparatus 200, a timeout occurs in communication between the second printer 100B and the terminal apparatus 200, and a communication error is returned to the communication section 120 of the second printer 100B (S610). In this case, the execution-target job continues to be acquired from the first printer 100A. Specifically, the second printer 100B acquires the execution-target job that is the printing setting information and the printing image data, from the first printer 100A (S609). The processing in S606 and S609 is as illustrated in S405 and S406 in FIG. 8 and illustrated in FIG. 10. S611 to S613 that are processing operations that are to be performed after acquiring the execution-target job are the same as S407 to S409 in FIG. 8.

Figure 13:
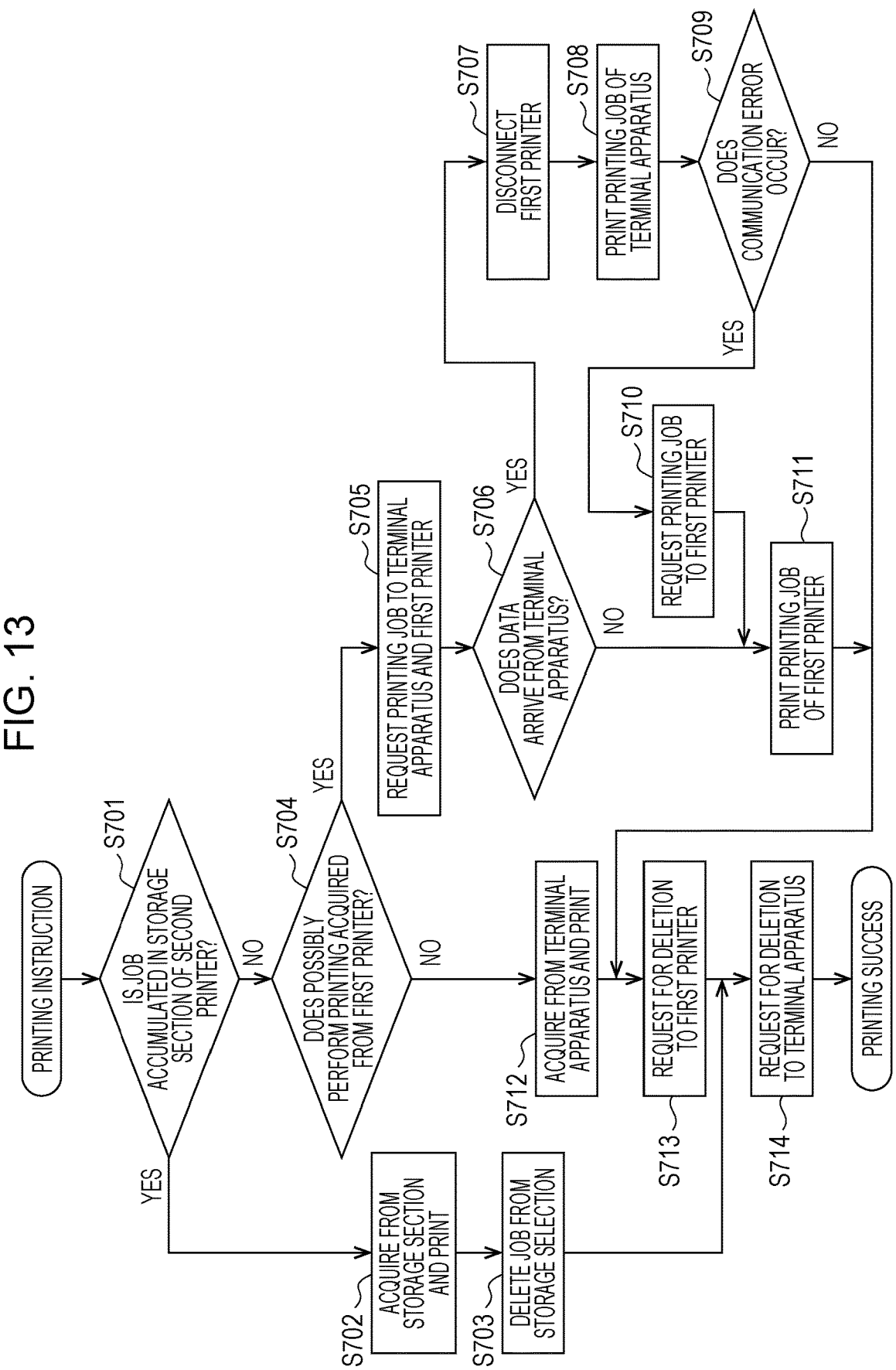
FIG. 13 is a flowchart for describing the different processing in the printing apparatus that performs the printing.

FIG. 13 is a flowchart for describing processing by the second printer 100B, which corresponds to S602 to S613 in FIG. 12. Processing in S701 to S704 is the same as that in S501 to S504 in FIG. 11.

When it is determined that it is possible that the execution-target job is acquired from the first printer 100A and the printing on the acquired execution-target job is performed (Yes in S704), the processing section 110 of the second printer 100B transmits the request for the acquisition of the printing job to both the first printer 100A and terminal apparatus 200 (S705). After the processing in S705, the second printer 100B determines whether or not the execution-target job starts to be acquired from the terminal apparatus 200 (S706).

When the result in S706 is Yes, in order to avoid acquiring the execution-target job in a redundant manner, and in order to reduce the load on the first printer 100A, the second printer 100B releases a connection to the first printer 100A (S707). That is, the first printer 100A acquires the execution-target job from the terminal apparatus 200 and performs the printing on the acquired execution-target job (S708).

In S708, the execution-target job starts to be acquired from the terminal apparatus 200, but it is not ensured that the connection to the terminal apparatus 200 is maintained until the acquision of the execution-target job is completed. Consequently, the processing section 110 determines whether or not the communication error occurs during a duration that ends until the reception of the execution-target job is completed (S709).

When the result in S709 is No, in order to normally complete the acquisition of the execution-target job from the terminal apparatus 200 and the performing of the printing on the acquired execution-target job, the second printer 100B transmits the request for the deletion of the execution-target job to the first printer 100A and the terminal apparatus 200 (S713 and S714) and ends the processing.

When the result in S709 is Yes, it is determined that the acquisition of the execution-target job from the terminal apparatus 200 is not ended in a normal mode. When the transfer of the execution-target job by the terminal apparatus 200 is in error, the processing section 110 of the second printer 100B transmits the request for the acquisition of the execution-target job to the first printer 100A that is a different printing apparatus 100 (S710). If this is done, when the communication with the terminal apparatus 200 is in error while the acquisition of the execution-target job is in progress, it is also possible that the execution-target job continues to be acquired.

When the result in S706 is No, or when the processing in S710 is performed, the second printer 100B completes the acquisition of the execution-target job from the first printer 100A and performs the printing on the acquired execution-target job (S711). After performing the printing, the second printer 100B transmits the request for the deletion of the execution-target job to the first printer 100A and the terminal apparatus 200 (S713 and S714), and then ends the processing.

When it is determined that it is not possible that the acquisition of the execution-target job from the first printer 100A and that the printing on the acquired execution-target job is performed (No in S704), the processing section 110 acquires the execution-target job from the terminal apparatus 200 and performs the printing on the acquired execution-target job (S712). After performing the printing, the second printer 100B transmits the request for the deletion of the execution-target job to the first printer 100A and the terminal apparatus 200 (S713 and S714), and then ends the processing.

It is noted that, when in S710, a request is made to the first printer 100A for the execution-target job, it is assumed that up to pieces of data in the execution-target job are acquired from the terminal apparatus 200. For that reason, when the acquisition of the execution-target job from the first printer 100A starts from a head of the data, redundancy occurs in the execution-target job that is received. Consequently, when the transfer of the execution-target job by the terminal apparatus 200 is in error, the processing section 110 of the second printer 100B may transmit a request for acquisition of information that is not completely received from the terminal apparatus, in the execution-target job, to the first printer 100A that is a different printing apparatus 100. For example, the second printer 100B makes a request to the first printer 100A for data subsequent to the data that is completely acquired from the terminal apparatus 200. If this is done, it is possible that redundant pieces of data are suppressed and thus that efficient communication is realized.

3. Second Embodiment

As described above, when the first printer 100A and the second printer 100B are of the same type of apparatus, the printing on the printing job accumulated in the first printer 100A is possibly performed in the printing section 140 of the second printer 100B. On the other hand, when the first printer 100A and the second printer 100B are of different types of apparatuses, there is a likelihood that the printing on the printing job accumulated in the first printer 100A will not be performed in the printing section 140 of the second printer 100B. However, in some cases, it is possible that the printing job is also shared between different type of apparatuses. For that reason, the prohibition of the sharing of the printing job in the same manner between different types of apparatuses is an excessive precaution, and there is a concern that the user convenience will be reduced.

Even when a different printing apparatus 100 is of a different type of apparatus, the processing section 110 of the printing apparatus 100 according to the present embodiment acquires the printing job accumulated in the different printing apparatus 100 from the different printing apparatus 100, under the condition that, based on the first determination to the third determination, it is determined that the printing is possibly performed, and causes the printing section 140 to perform the printing on the acquired printing job. If this is done, it can be suitably determined whether or not the execution-target job is acquired from a different printing apparatus 100. For that reason, it is possible that both suppression of unsuitable printing and an improvement in convenience are both achieved compatibly. It is noted that one or two determinations that are among the first determination to the third determination may be omitted and that a different determination may be added. Specific processing that includes determination processing will be described below.

It is noted that in the present embodiment, a configuration in which the execution-target job is acquired from the terminal apparatus 200 is not a requirement. Consequently, an example is described here, in which the execution-target job is acquired from other printing apparatus 100, more specifically, the first printer 100A.

3.1 Printing Processing

A flow for processing in the second embodiment is the same as in FIG. 3. Furthermore, processing in S101 and S102 is also as described above with reference to FIGS. 4 to 7. However, in the present embodiment, it is not assumed that the execution-target job is acquired from the terminal apparatus 200. For that reason, in the processing in S102, the acquisition of a transmission source address by the second printer 100B from a different printing apparatus 100 is not a requirement. On the other hand, as will be described below with reference to FIG. 15, in some cases, the second printer 100B makes the first determination relating to a printing setting in determining whether or not it is possible that printing is performed. In such a case, the second printer 100B needs to acquire the printing setting information from a different printing apparatus 100. Furthermore, in a technique according to the present embodiment, the detail of the processing in S103 is different from that in the first embodiment.

Figure 14:
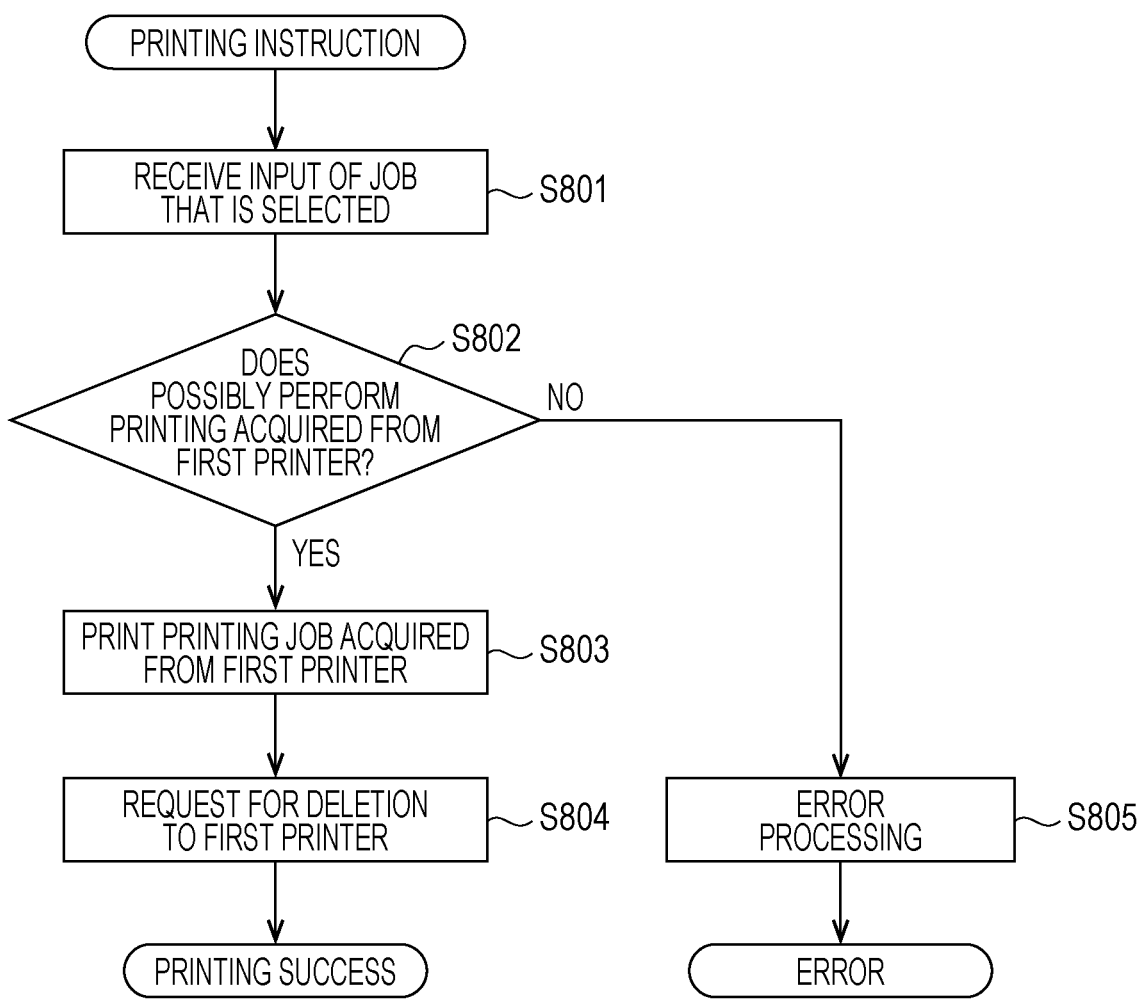
FIG. 14 is a flowchart for describing printing processing in a second embodiment.

FIG. 14 is a flowchart for describing the printing processing in the second embodiment. First, the second printer 100B receives an input, that is, the execution-target job that is selected using the job selection screen (S801). It is assumed here that the printing job accumulated in the first printer 100A is selected as the execution-target job. In the present embodiment, it is considered that the execution-target job from the terminal apparatus 200 is acquired. Consequently, the second printer 100B determines whether or not the printing on the execution-target job accumulated in the first printer 100A is possibly performed in the printing section 140 of its own (S802).

When it is determined that the printing is possibly performed (Yes in S802), the second printer 100B acquires the execution-target job from the first printer 100A and performs the printing on the acquired execution-target job (S803). The second printer 100B transmits the request for the deletion of the execution-target job to the first printer 100A (S804) and then ends the processing in the normal mode. When it is determined that the printing cannot be performed (No in S802), the second printer 100B performs the error processing and then ends the processing in the abnormal mode. For example, when it is determined that the printing on the printing job accumulated in a different printing apparatus 100 cannot be performed, the processing section 110 of the second printer 100B performs the reporting processing that provides a suggestion to perform the printing on the printing job in the printing apparatus 100 that is the same in type as the different printing apparatus 100.

Figure 15:
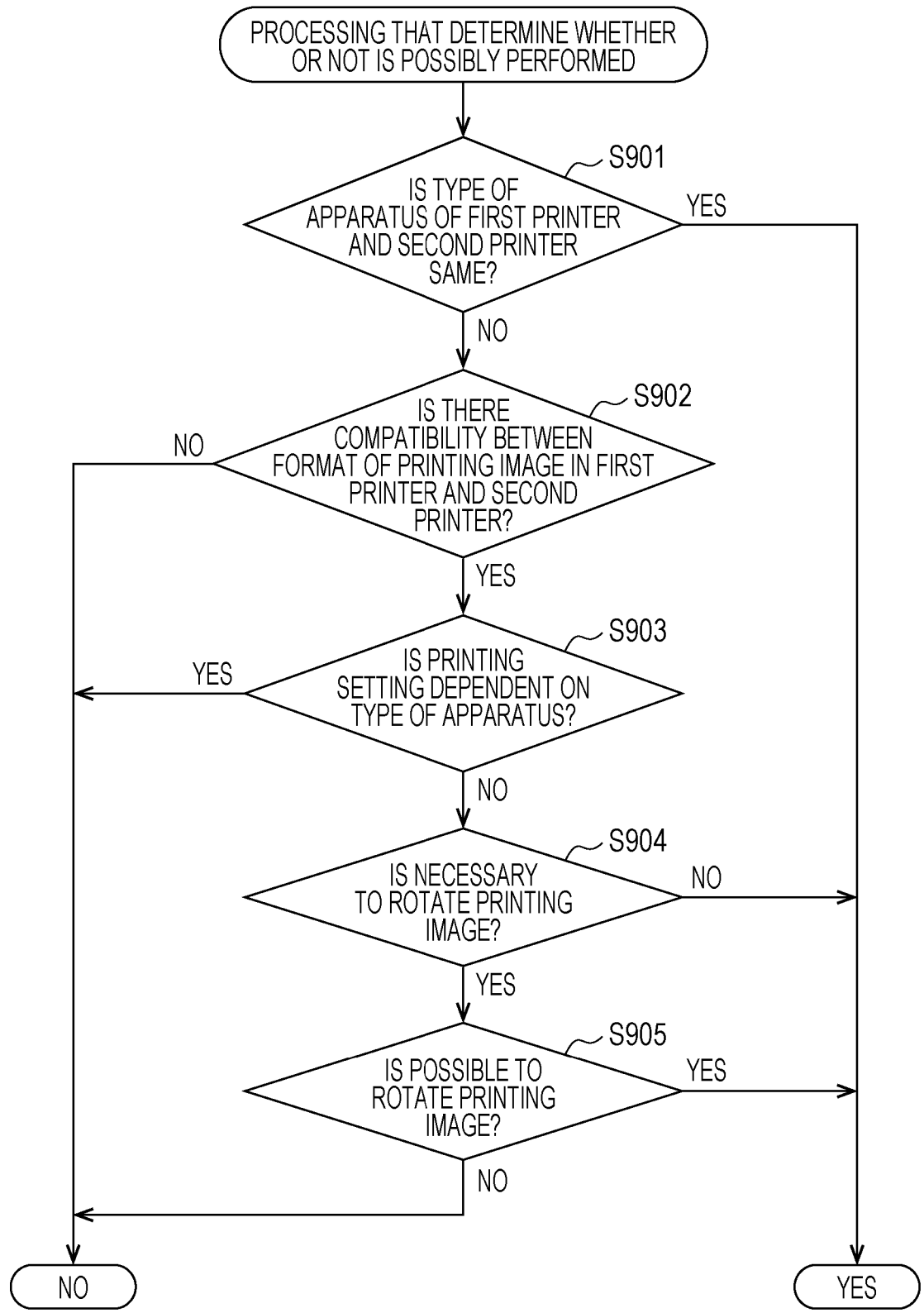
FIG. 15 is a flowchart for describing processing in the second embodiment that determines whether or not the printing is possibly performed.

FIG. 15 is a flowchart for describing processing in S802 in the present embodiment. When this processing is started, the second printer 100B determines whether or not the first printer 100A and the second printer 100B are of the same type of apparatus (S901). When the two printers are of the same type of apparatus (Yes in S901), the second printer 100B determines that the printing on the printing job is possibly performed in the first printer 100A. In a technique according to the present embodiment, when the result of the determination in S901 is No, it is not immediately determined that the printing can be performed, and, depending on the conditions, there is room for determination that the printing is possibly performed.

In an example in FIG. 15, first, the second printer 100B makes the third determination in which the data format of the printing image data is determined (S902). For example, as the printing apparatuses 100, there are a type of apparatus that expresses the printing image data using bit map data that is a combination of pixel values of Red, Green, and Blue (RGB) and a type of apparatus that expresses the printing image data using bit map data that is a combination of cyan, magenta, and yellow (CMY). It is noted that actual printing image data may be data that results from performing compression processing on the bit map data. There is no compatibility between an RGB format and a CMY format. A type of apparatus that supports one format, although it acquires the printing image data in the other format, cannot performs desired printing processing.

Furthermore, as the printing apparatus 100, there is a type of apparatus that uses data representing a paper sheet feeding command instead of the bit map data, for a white area, that is, an area where a color of a printing paper sheet is usable as is. On the other hand, as the printing apparatus 100, there is a type of apparatus that needs the bit map data even for the white area without following the paper sheet feeding command. A type of apparatus that follows the paper sheet feeding command, for example, is a serial ink jet printer. A type of apparatus that does not follow the paper sheet feeding command, for example, is a line ink jet printer or a laser printer. When the paper sheet feeding command is included in the printing image data accumulated by the first printer 100A and where the second printer 100B is a type of apparatus that does not follow the paper sheet feeding command, desired printing processing can be performed.

The second printer 100B determines whether or not there is compatibility between the data format of the printing image data in the first printer 100A in S902 and the data format of the printing image data in the second printer 100B. When there is no compatibility (No in S902), the second printer 100B determines that the printing on the printing job in the first printer 100A can be performed. It is noted that, when determining the compatibility of the printing image data, it is not preferable that the entire printing image data is acquired. Consequently, the second printer 100B acquires information that possibly specifies the data format of the printing image, as the information relating to the printing job, in the processing in S102. The information that possibly specifies the data format, for example, may be information such as a header and may be information that results from (selecting) one portion of the printing image data.

When it is determined that the compatibility is ensured (Yes in S902), the second printer 100B makes the first determination of the printing job accumulated in the first printer 100A includes the printing setting that is dependent on the type of apparatus (S903). Specifically, the processing section 110 of the second printer 100B determines that it is determined that the printing is performed, under the condition that it is determined that the printing job does not include the printing setting that is dependent on the type of apparatus. That is, when the printing job includes the printing setting that is dependent on the type of apparatus (Yes in S903), the second printer 100B determines that the printing on the printing job in the first printer 100A cannot be performed.

At this point, the printing setting that is dependent on the type of apparatus includes at least one of a setting of a type of printing paper sheet and a setting relating to special printing. The type of paper sheet for printing is information indicating a size and material of the printing paper sheet. For example, the printing apparatus 100 that possibly performs printing for a A4 size or smaller cannot suitably perform the printing on the printing job that designates a A3 size. Furthermore, the printing apparatuses 100 are different in terms of whether or not to print a photographic paper sheet, whether or not to print a CD label, or the like. The second printer 100B acquires printing setting information as the information relating to the printing job, from the first printer 100A, and compares a type of printing paper sheet that is included in the printing setting information and a type of printing paper sheet, printing on which is supported by the second printer 100B itself. when the type of printing paper sheet that is indicated by the printing setting information is a type of printing paper sheet, printing on which is possibly not supported, the second printer 100B determines that the printing setting that is dependent on the type of apparatus is included. That is, the result in S903 is Yes, and it is determined that the printing on the printing job in the first printer 100A cannot be performed.

Furthermore, the special printing, for example is printing in which an amount of ink to be discharged is adjusted according to an area of an original document. As the special printing, for example, a bar code printing is considered. In order to accurately read a bar code printed on a printing medium, there is a need to suppress bleeding of a bar code portion. Consequently, particularly in an ink jet printer, an amount of ink that to be discharged on a portion on which a bar code is printed is suppressed. However, specific control to suppress an amount of ink changes according to a mechanical configuration of the printing apparatus 100, a property of ink that fills the printing apparatus 100, and the like. That is, when a setting of a bar code printing in a given apparatus is also used in a different apparatus, desired printing processing cannot be performed.

Furthermore, as the special printing, watermark printing is considered. The watermark printing is a mode in which watermark is printed on a background portion, for example, when printing an original document that is an original. The watermark is arbitrary information, such as text, and, for example, is printed in a low-visibility state in the original. when the original is copied, the watermark is printed in a high-visibility state on a resulting copy. The printing of the watermark is realized by printing minute points different in size or density on a background area. For that reason, on a portion in which the watermark is buried, the printing apparatus 100 performs discharging of ink in a different state than for a letter or an image as usual. In this case, because desirable ink discharging control also differs according to a type of the printing apparatus 100, when a setting of the watermark in a given type of apparatus is also used in another type of apparatus, desired printing processing cannot be performed.

When the printing job in the first printer 100A includes a setting relating to a special printing, although the second printer 100B supports the special printing, as long as the printers are of different types of apparatuses, the printing on the printing job is difficult to perform in the second printer 100B. Consequently, when the printing setting information includes a setting for performing special printing, the second printer 100B determines that the printing setting that is dependent on the type of apparatus is included. That is, the result in S903 is Yes, and it is determined that the printing on the printing job in the first printer 100A cannot be performed. If this is done, considering a type of printing paper sheet and special printing, it is determined whether or not the printing on the printing job is possibly performed.

Alternatively, the printing setting that is dependent on the type of apparatus may be retained by a different printing apparatus 100 and may be a setting relating to a hardware resource that is not retained by the printing apparatus 100 itself. The hardware resource here, for example, is a finisher. The finisher is hardware that has a function in which multiple original documents that are results of the printing are put together using a staple, a function of making a punched hole in the original document, a function of bending the original document, and the like. Although a setting for using the finisher is set to be in the printing setting, if the finisher is not mounted in the second printer 100B, staple processing and the like cannot be performed. Consequently, when a setting for using a hardware resource that is not retained by the second printer 100B is included in the printing setting information, the second printer 100B determines that the printing setting that is dependent to the type of apparatus is included. That is, the result in S903 is Yes, and it is determined that the printing on the printing job in the first printer 100A cannot be performed. If this is done, it is possible that, considering a hardware configuration of the printing apparatus 100, it is determined whether or not the printing on the printing job is possibly performed.

When it is determined that the printing setting that is dependent on the type of apparatus is not include (No in S903), the second printer 100B makes the second determination relating to the processing that rotates a printing image. As a paper sheet feeding direction in the printing apparatus 100, there are long edge feed (LEF) that is present a direction in which a long side of a printing paper sheet is positioned in a manner that is normal to a transportation direction and short edge feed (SEF) that is a direction in which a short side of the printing paper sheet is positioned in a manner that is normal to the transportation direction. As the printing apparatus 100, there is present a type of apparatus that does not support only one of the LEF and SEF. The LEF and the SEF are different in the order in which pixels of the printing image data are printed. For that reason, when the printing on the printing job for which the SEF is set is performed in a type of apparatus that supports the LEF, or when the printing on the printing job for which the LEF is set is performed in a type of apparatus that supports the SEF, there is a need for the processing that rotates the printing image data by 90 degrees.

Thus, the second printer 100B first compares a feeding direction that is included in the printing setting information in the execution-target job and a feeding direction that is supported by the second printer 100B itself, and thus determines whether or not there is a need for the processing that rotates the printing image data (S904). When the rotation processing is unnecessary (No in S904), the second printer 100B determines that the printing on the printing job in the first printer 100A is possibly performed in the printing section 140 of its own.

When the rotation processing is necessary (Yes in S904), the second printer 100B determines whether or not it is possible that the processing that rotates the printing image data in the execution-target job is performed (S905). When the processing section 110 of the second printer 100B does not originally support the rotation processing, it is determined that the rotation processing cannot be performed. Furthermore, in order to perform the rotation processing, temporarily, there is a need to accumulate the entire printing image data in the execution-target job in a memory, such as a RAM, that is included in the second printer 100B. When an amount of available space capacity of the RAM is small for a data size of the printing image data, it is determined that the rotation processing cannot be performed. When the rotation processing is possible (Yes in S905), the second printer 100B determines that the printing on the printing job in the first printer 100A is possibly performed in the printing section 140 of its own.

As described above, the processing section 110 of the second printer 100B determines that the printing is possibly performed, under the condition that the processing that rotates the printing image which is a target to be printed in the printing job is not necessary (No in S904) or under the condition that the processing that rotates the printing image is necessary and that it is possible that the rotation processing is performed (Yes in S904 and Yes in S905). If this is done, it is possible that, considering the processing that rotates the printing image data, it is determined whether or not the printing on the printing job is possibly performed.

FIG. 15 illustrates an example in which the second printer 100B makes the first determination, the second determination, and the third determination. In this case, it is determined that the printing on the printing job in the first printer 100A is possibly performed, when a condition that the printing is possibly performed is satisfied in the first determination (No in S903), a condition that the printing is possibly performed is satisfied in the second determination (No in S904 or Yes in S905), and a condition that the printing is possibly performed is satisfied in the third determination (Yes in S902). When the conditions are satisfied in all the three determinations, it is determined that the printing is possibly performed. Because of this, the order of the determinations is not limited to an example in FIG. 15.

Furthermore, one or two of the first to third determinations may be omitted. For example, the second printer 100B may omit one of the first to third determinations, and based on the remaining two determinations, may determine whether or not the printing on the printing job in the first printer 100A is possibly performed. In this case, if both the remaining two determinations satisfy the conditions described above, it is also determined that the printing is possibly performed. Alternatively, the second printer 100B may omit two of the first to third determinations, and based on the remaining one determination, may determine whether or not the printing on the printing job in the first printer 100A is possibly performed.

The example is described above where the processing section 110 of the second printer 100B determines whether or not the printing on the printing job as a target, which is selected from among the printing jobs that are accumulated by the first printer 100A that is a different printing apparatus 100, is possibly performed. More specifically, the processing section 110 of the second printer 100B acquires the printing job accumulated in the storage section 130 of its own and the information relating to the printing job accumulated in a different printing apparatus 100, and based on the acquired information, performs processing that displays the job selection screen on the display section 150. Then, the second printer 100B determines whether or not the printing on the printing job as a target, which is selected from the job selection screen is possibly performed (S801 and S802). If this is done, it is possible that the processing is performed that determines as targets one or several printing jobs, which are selected from among the printing jobs accumulated in a different printing apparatus 100, such as the first printer 100A. For that reason, it is possible that a load applied on the determination processing is reduced. Particularly, because the printing job selected from the job selection screen, that is, the execution-target job is a printing job, printing on which is desired by the user, it is possible that a suitable printing job is set to be a target for determination of whether or not the printing is possibly performed.

However, a timing for making a determination of whether or not the printing is possibly performed, and the printing job that is a target for the determination are not limited to what is described above. For example, the processing section 110 of the second printer 100B may determine whether or not the printing on the printing job accumulated in a different printing apparatus 100 is possibly performed. Specifically, when acquiring the information relating to the printing job from the first printer 100A that is a different printing apparatus 100, and the third printer 100C to the fifth printer 100E, the second printer 100B makes a determination of whether or not printing on each of the acquired printing job, as a target, is possibly performed. Specifically, the acquisition of the information relating to the printing job corresponds to the processing that is described above with reference to S102 in FIG. 3 and to FIG. 6.

In this case, the processing section 110 of the second printer 100B performs the processing that displays the job selection screen on which the printing job accumulated in the storage section 130 of its own and the printing job, the printing on which is determined as being possible, among the printing jobs accumulated in a different printing apparatus 100, on the display section 150. Then, the processing section 110 causes the printing section 140 to perform the printing on the printing job selected from the job selection screen. If this is done, the printing job displayed on the job selection screen is acquired from a different printing apparatus 100, and then a limitation to the possibility of the printing in the printing section 140 of the second printer 100B is imposed. The number of the printing jobs that are targets for the determination increases, but, after an execution-target job is determined, because a case where the printing on the execution-target job cannot be performed can be suppressed from occurring, an improvement in convenience is possible.

4. Modification Example

Several modification examples will be described below.

4.1 Combination of First Embodiment and Second Embodiment

A modification implementation that results from combining the first embodiment and the second embodiment that are described above is possible. In the first embodiment, the step of determining whether or not the printing is possibly performed, which is illustrated in S504 and S510 in FIG. 11 is described as the determination of whether or not the first printer 100A and the second printer 100B are of the same type of apparatus. It is possible that the determination step is replaced with the processing that is described with reference to FIG. 15 in the second embodiment.

In the present modification example, in the same manner as in the first embodiment, the processing section 110 of the second printer 100B determines from which one of a different printing apparatus 100 and the terminal apparatus 200 that transmits the printing job to the different printing apparatus 100 the printing job accumulated in the different printing apparatus 100 is acquired. On that occasion, the second printer 100B determines whether or not the printing on the printing job accumulated in the first printer 100A is possible in the printing section 140 of its own, based on the determination of whether or not the same types of apparatuses are ensured (S901), and at least one of the first, second, and third determinations (S902 to S905). Then, when it is determined that the printing on the printing job cannot be performed (No in S504), the second printer 100B acquires the printing job from the terminal apparatus 200 (S508).

If this is done, it is possible that the acquisition destination of the printing job is flexibly selected from between a different printing apparatus 100 and the terminal apparatus 200, and in addition, it is also possible that the probability that the printing job will be determined as being acquirable from the different printing apparatus 100 is increased. That is, because the probability that printing on a desired printing job will be suitably performed is increased, an improvement in user convenience is possible.

4.2 Batch Printing

Furthermore, as illustrated in S102 in FIG. 3, the example is described above where the job selection screen is displayed on the display section 150 of the second printer 100B and where an input, that is, the execution-target job that is selected by the user, is received. However, the displaying of the job selection screen and the reception of the input that is selected are omissible.

Specifically, when acquiring the information relating to the printing job from a different printing apparatus 100, the second printer 100B automatically determines all printing jobs relating to the user who logs in, as the execution-target jobs, and thus performs batch printing on the execution-target jobs.

With a technique according to the first embodiment, the second printer 100B acquires the automatically-determined execution-target job from any one of the first printer 100A and the terminal apparatus 200 and performs the processing that performs printing on the acquired execution-target job. When multiple printing jobs are selected as the execution-target jobs, the second printer 100B performs the same processing on each of the execution-target jobs. A specific procedure is the same as in FIGS. 8 to 13 except that the processing in each of S401 and S601 is automated.

Furthermore, with a technique according to the second embodiment, the second printer 100B performs the processing that determines whether or not printing on the automatically-determined execution-target job as a target is possibly performed according to the flowchart that is illustrated in FIG. 15. Specifically, the processing section 110 of the second printer 100B determines whether or not printing on the printing job accumulated in a different printing apparatus 100 is possibly performed. Then, the processing section 110 causes the printing section 140 to perform printing on the printing job, printing on which is determined as being possibly performed, among the printing jobs accumulated in a different printing apparatus 100.

As described above, a printing apparatus according to the present embodiment is a printing apparatus that shares a printing job with a different printing apparatus. The printing apparatus includes a communication section that performs communication with a different printing apparatus, a processing section that performs control of the communication section, a storage section in which the printing job is accumulated, and a printing section that performs printing based on the printing job. When the printing job that is not accumulated in the storage section and is accumulated in a different printing apparatus is determined as an execution-target job, the processing section acquires the execution-target job from any one of the different printing apparatus that accumulates the execution-target job and a terminal apparatus that transmits the execution-target job to the different printing apparatus.

For the capability of a different printing apparatus, there is a concern that it will take time to transmit the execution-target job that the printing performance of the printing apparatus will not be brought into play to a maximum. On the other hand, the terminal apparatus has a relatively high processing capability, but is powered off or is disconnected from a network with high frequency. In a printing system in which the printing job is shared, both of a different printing apparatus and the terminal apparatus is set to be selectable as an acquisition destination of the execution-target job and thus it is possible that convenience is improved.

Furthermore, the processing section may perform processing that determines from which one of a different printing apparatus and the terminal apparatus the execution-target job is acquired.

If this is done, the determination processing is performed in advance, but it is possible that the execution-target job is acquired from a suitable apparatus.

Furthermore, the processing section may determine whether or not the execution-target job is acquirable from the terminal apparatus and, when it is determined that the execution-target job cannot be acquired, may acquire the execution-target job from a different printing apparatus.

If this is done, when the execution-target job cannot be acquired from the terminal apparatus, it is possible that an acquisition destination is switched to a different printing apparatus.

Furthermore, when it is determined that the execution-target job cannot be acquired from a different printing apparatus, the processing section may perform error processing.

If this is done, it is possible that an appropriate action is taken when an error occurs.

Furthermore, the processing section may perform the determination processing based on a parameter indicating a speed at which the printing on the execution-target job is performed by the printing section and a parameter indicating a speed at which the execution-target job is transferred by a different printing apparatus.

If this is done, a specific state of a different printing apparatus is considered and then it is possible that the acquisition destination of the execution-target job is determined.

Furthermore, the processing section may transmit a request for acquisition of the execution-target job both to a different printing apparatus and the terminal apparatus.

In this manner, the execution-target jobs are acquired concurrently, and thus it is possible that printing processing is performed at a high speed.

Furthermore, when the terminal apparatus starts to transfer the execution-target job, the processing section may stop processing that acquires the execution-target job from a different printing apparatus.

If this is done, it is possible not only that the execution-target job is suitably acquired, but also that a communication load on a network and a load on the processing by a different printing apparatus are reduced.

Furthermore, when the transfer of the execution-target job by the terminal apparatus is in error, the processing section may transmit the request for the acquisition of the execution-target job to a different printing apparatus.

If this is done, when communication with the terminal apparatus is interrupted while the execution-target job is being transferred, the switching of the acquisition destination of the execution-target job takes place, and thus it is possible that the execution-target job is suitably acquired.

Furthermore, when the transfer of the execution-target job by the terminal apparatus is in error, the processing section may transmit a request for acquisition of information that is not completely received from the terminal apparatus, in the execution-target job, to a different printing apparatus.

If this is done, it is possible that the reception of pieces of redundant data is suppressed and that efficient communication is realized.

Furthermore, when the printing section determines that the printing section completes the processing that performs the printing on the execution-target job, the processing section may transmit the request for the deletion of the execution-target job to a different printing apparatus and the terminal apparatus.

If this is done, it is possible that the printing job, the printing processing on which is completed, is suitably deleted.

Furthermore, the printing apparatus may further include a display section. The processing section acquires information relating to the printing job accumulated in the storage section and information relating to the printing job accumulated in a different printing apparatus, based on the acquired pieces of information, performs processing that displays a job selection screen on the display section, and determines the printing job selected from the job selection screen, as the execution-target job.

If this is done, it is possible that the user is suitably provided with the printing job that is a candidate for a target to be printed and that the user is urged to select the execution-target job.

Furthermore, the processing section may periodically determine whether or not communication by the communication section with a different printing apparatus is possible and may perform processing that excludes the different printing apparatus determined as incommunicable, as a target from which the information relating to the printing job is acquired.

If this is done, when displaying the job selection screen, there is no need to wait a timeout due to a communication error. Because of this, an interface that makes the user feel uncomfortable can be realized.

Furthermore, the printing job may include identification information on the printing job, printing setting information, and printing image data.

If this is done, it is possible that the printing job is suitably identified and that a desired image is printed at a desired setting.

Furthermore, the printing job that is stored in a different printing apparatus may include information for specifying a terminal apparatus that is a transmission source.

If this is done, in the printing apparatus that performs printing, it is possible that a suitable terminal apparatus is selected as the acquisition destination of the execution-target job.

Furthermore, in a printing system according to the present embodiment includes any one of the printing apparatuses described above, a different printing apparatus, and a terminal apparatus. When the printing job is transmitted to a different printing apparatus, the terminal apparatus accumulates the received printing job in a storage unit of the terminal apparatus itself. Furthermore, when restarting is performed, the terminal apparatus acquires the information relating to the printing job that is accumulated by a different printing apparatus, from the different printing apparatus, and, when the printing job transmitted from the terminal apparatus is not accumulated by the different printing apparatus, deletes the printing job transmitted from the different printing apparatus, from the storage unit of the terminal apparatus itself.

If this is done, because the printing job transmitted to a given printing apparatus is also accumulated in the terminal apparatus, it is possible that the printing apparatus selects the terminal apparatus as the acquisition destination of the execution-target job. Furthermore, after the printing is completed, when the request for the deletion of the execution-target job can be received from the printing apparatus, on the terminal apparatus side, it can also be determined whether or not to make a deletion. Because of this, information that is at a low-level necessity can be suppressed from being continuously accumulated in the terminal apparatus.

Furthermore, a printing processing method according to the present embodiment is a printing processing method in the printing apparatus that shares the printing job with a different printing apparatus. In the printing processing method, when the printing job that is not accumulated in the storage section and is accumulated in the different printing is determined as an execution-target job, printing on which is to be performed in the printing apparatus, the execution-target job is acquired from any one of the different printing apparatus that accumulates the execution-target job and a terminal apparatus that transmits the execution-target job to the different printing apparatus.

It is noted that the present embodiment is described in detail above, but that a person of ordinary skill in the art can easily understand that many modifications are possible which do not substantially depart from new matters or effects according to the present disclosure. Therefore, such modification examples are all included within the scope of the present disclosure. For example, the term that is described at least one time together with a different term that has a broader meaning or the same meaning, in the specification or the drawings, can be replaced with such a different term, throughout the specification or the drawings. Furthermore, all combinations of the present embodiment and the modification examples are also included in the scope of the present disclosure. Furthermore, configurations, operations, and the like of the printing apparatus, the terminal apparatus, and the printing system are not limited to those which are described in the present embodiment, and various modification implementations are possible.

What is claimed is:

1. A printing apparatus that shares a printing job with a different printing apparatus, the printing apparatus comprising:
a processor that manages the printing job;
a storage section in which the printing job is accumulated; and a printing section that performs printing based on the printing job, wherein when the printing job that is not accumulated in the storage section and is accumulated in the different printing apparatus is determined as the execution-target job, the processor selects one terminal from among multiple terminals that include the different printing apparatus that accumulates an execution-target job and a terminal apparatus which transmits the execution-target job to the different printing apparatus, and acquires the execution-target job from the selected terminal.

2. The printing apparatus according to claim 1, wherein the processor determines whether or not the execution-target job is acquirable from the terminal apparatus, and, when it is determined that the execution-target-job is not able to be acquired, selects the different printing apparatus.

3. The printing apparatus according to claim 2, wherein the processor performs error processing when it is determined that the execution-target object job is not able to be acquired from the different printing apparatus.

4. The printing apparatus according to claim 1, wherein the processor makes a selection based on a parameter indicating a speed at which printing on the execution-target job is performed by the printing section and a parameter indicating a speed at which the execution-target job is transferred by the different printing apparatus.

5. The printing apparatus according to claim 1, wherein the processor transmits a request for acquisition of the execution-target job to both the different printing apparatus and the terminal apparatus.

6. The printing apparatus according to claim 5, wherein the processor selects the terminal apparatus and stops processing that acquires the execution-target job from the different printing apparatus, when the terminal apparatus starts to transfer the execution-target job.

7. The printing apparatus according to claim 6, wherein the processor selects the different printing apparatus and transmits a request for acquisition of the execution-target job to the different printing apparatus, when the transfer of the execution-target job by the terminal apparatus is in error.

8. The printing apparatus according to claim 7, wherein the processor transmits a request for acquisition of information in the execution-target job, whose reception from the terminal apparatus is not completed, to the different printing apparatus, when the transfer of the execution-target job by the terminal apparatus is in error.

9. The printing apparatus according to claim 1, wherein the processor transmits a request for deletion of the execution-target job to the different printing apparatus and the terminal apparatus, when it is determined that the printing section completes processing that performs printing on the execution-target job.

10. The printing apparatus according to claim 1, further comprising:

a display section, wherein the processor acquires information relating to the printing job accumulated in the storage section, and information relating to the printing job accumulated in the different printing apparatus, performs processing that displays a job selection screen on the display section, based on the acquired pieces of information, and determines the printing job selected from the job selection screen, as the execution-target job.

11. The printing apparatus according to claim 10, wherein the processor periodically determines whether or not the communication section is configured to communicate with the different printing apparatus and performs processing that excludes the different printing apparatus determined as incommunicable, as a target from which the information relating to the printing job is acquired.

12. The printing apparatus according to claim 1, wherein the printing job incudes identification information on the printing job, printing setting information, and printing image data.

13. The printing apparatus according to claim 12, wherein the printing job stored in the different printing apparatus includes information for specifying the terminal apparatus that is a transmission source.

14. A printing system comprising:
the printing apparatus according to the claim 1;
the different printing apparatus; and
the terminal apparatus, wherein
when the printing job is transmitted to the different printing apparatus, the terminal apparatus accumulates the transmitted printing job in a storage unit of the terminal apparatus and
the terminal apparatus acquires information relating to the printing job accumulated by the different printing apparatus, from the different printing apparatus, when restarting is performed, and deletes the printing job transmitted to the different printing apparatus, from the storage unit of the terminal apparatus, when the printing job transmitted from the terminal apparatus is not accumulated by the different printing apparatus.

15. A printing processing method in a printing apparatus that shares a printing job with a different apparatus, the method comprising:

selecting one terminal from among multiple terminals that include the different printing apparatus that accumulates an execution-target job and a terminal apparatus which transmits the execution-target job to the different printing apparatus, when the printing job that is not accumulated in the printing apparatus and is accumulated in the different printing apparatus is determined as the execution-target job, printing on which is to be performed in the printing apparatus; and acquiring the execution-target job from the selected terminal.

* * * * *